US011096323B2

(12) United States Patent
Wolters et al.

(10) Patent No.: US 11,096,323 B2
(45) Date of Patent: Aug. 24, 2021

(54) MACHINE CONTROL SYSTEM PROVIDING ACTIONABLE MANAGEMENT INFORMATION AND INSIGHT USING AGRICULTURAL TELEMATICS

(71) Applicant: CropZilla Software, Inc., Columbus, OH (US)

(72) Inventors: Dustin J. Wolters, Columbus, OH (US); Brian H. Watkins, Dublin, OH (US); Michael J. Thompson, Westerville, OH (US)

(73) Assignee: CropZilla Software, Inc., Columbus, OH (US)

( * ) Notice: Subject to any disclaimer, the term of this patent is extended or adjusted under 35 U.S.C. 154(b) by 429 days.

(21) Appl. No.: 16/043,229

(22) Filed: Jul. 24, 2018

(65) Prior Publication Data
US 2018/0325015 A1 Nov. 15, 2018

Related U.S. Application Data

(63) Continuation-in-part of application No. 15/490,791, filed on Apr. 18, 2017, now Pat. No. 10,368,475.
(Continued)

(51) Int. Cl.
*A01B 79/00* (2006.01)
*B60W 10/20* (2006.01)
(Continued)

(52) U.S. Cl.
CPC .......... *A01B 79/005* (2013.01); *A01B 69/008* (2013.01); *B60W 10/10* (2013.01);
(Continued)

(58) Field of Classification Search
CPC ....... A01B 69/00; A01B 79/02; A01B 79/005; A01B 69/008; A01B 69/007;
(Continued)

(56) References Cited

U.S. PATENT DOCUMENTS 5,566,069 A 10/1996 Clark, Jr. et al.
5,978,723 A 11/1999 Hale et al.
(Continued)

FOREIGN PATENT DOCUMENTS

CN 107370510 A 11/2017
EP 2530530 A1 12/2012

OTHER PUBLICATIONS

Mohamed, Ahmed Khaled Abd El-Wahab; Analysis of Telematics Systems in Agriculture; Thesis submitted to Czech University of Life Sciences in Prague, Faculty of Engineering; May 2013; 95 pages; Department of Machinery Utilization Faculty of Engineering, Prague, Czechoslovakia.
(Continued)

*Primary Examiner* — Thomas G Black
*Assistant Examiner* — Matthias S Weisfeld
(74) *Attorney, Agent, or Firm* — Davis Malm & D'Agostine PC; Richard L. Sampson

(57) ABSTRACT

A machine control system includes an agricultural work machine having an ECU coupled via a system bus to control engine functions, a GPS receiver, data collector, and specialized guidance system including a stored program. The data collector captures agricultural geospatial data including location data for the work machine and data from the ECU, and executes the stored program to: (a) capture geometries of the farm; (b) capture agricultural geospatial data; (c) automatically classify the agricultural geospatial data using the geometries of the farm, into activity/event categories including operational, travel, and ancillary events; (d) aggregate the classified data to create geospatial data events; (e) match the geospatial data events to a model to generate matched events; (f) use the matched events to generate actionable information for the working machine in real time or near real-time; and (g) send operational directives to the
(Continued)

agricultural work machine based on the actionable information.

38 Claims, 16 Drawing Sheets

Related U.S. Application Data

(60) Provisional application No. 62/536,026, filed on Jul. 24, 2017.

(51) Int. Cl.
*A01B 69/04* (2006.01)
*G05D 1/02* (2020.01)
*B60W 10/10* (2012.01)

(52) U.S. Cl.
CPC ............ *B60W 10/20* (2013.01); *G05D 1/0219* (2013.01); *G05D 1/0274* (2013.01); *G05D 1/0278* (2013.01); *B60W 2300/15* (2013.01); *B60W 2510/00* (2013.01); *B60W 2510/30* (2013.01); *B60W 2520/10* (2013.01); *B60W 2530/00* (2013.01); *B60W 2555/00* (2020.02); *B60W 2710/10* (2013.01); *B60W 2710/20* (2013.01); *G05D 2201/0201* (2013.01)

(58) Field of Classification Search
CPC .. B60W 10/10; B60W 10/20; B60W 2555/00; B60W 2300/15; B60W 2510/00; B60W 2510/30; B60W 2520/10; B60W 2530/00; B60W 2710/10; B60W 2710/20; B60W 2300/152; B60W 2300/154; B60W 2300/158; B60W 2520/00; G05D 1/0219; G05D 1/0274; G05D 1/0278; G05D 2201/0201; G05D 1/021; G05D 1/02; G05D 1/00
USPC .......................................................... 701/25
See application file for complete search history.

(56) References Cited

U.S. PATENT DOCUMENTS

| | | | |
|---|---|---|---|
| 6,002,984 A | 12/1999 | Aughenbaugh | |
| 6,144,910 A | 11/2000 | Scarlett et al. | |
| 6,505,106 B1 | 1/2003 | Lawrence et al. | |
| 6,804,597 B1 | 10/2004 | Posselius et al. | |
| 6,865,582 B2 | 3/2005 | Obradovic et al. | |
| 6,876,920 B1 * | 4/2005 | Mailer .................... | A01B 69/00 701/470 |
| 7,397,392 B2 | 7/2008 | Mahoney et al. | |
| 7,580,808 B2 | 8/2009 | Bos | |
| 7,930,085 B2 | 4/2011 | Anderson et al. | |
| 7,991,754 B2 | 8/2011 | Maizel et al. | |
| 8,046,139 B2 * | 10/2011 | Diekhans ............ | A01D 41/1278 701/50 |
| 8,195,231 B2 | 6/2012 | Ring | |
| 8,275,506 B1 * | 9/2012 | Bishel .................... | G01S 13/87 701/25 |
| 8,359,141 B1 | 1/2013 | Lange | |
| 8,983,713 B2 * | 3/2015 | Shinohara ............... | H04L 67/10 701/31.5 |
| 9,152,938 B2 | 10/2015 | Lang et al. | |
| 9,699,958 B2 | 7/2017 | Koch et al. | |
| 10,194,575 B2 * | 2/2019 | Schmidt ................ | B60K 35/00 |
| 10,244,675 B2 * | 4/2019 | LaRowe .............. | G05D 1/0225 |
| 10,318,609 B2 * | 6/2019 | Blank ..................... | G06F 17/18 |
| 10,386,844 B2 * | 8/2019 | Wilcox ................. | H04W 4/021 |
| 2002/0022928 A1 | 2/2002 | Ell | |
| 2002/0103688 A1 | 8/2002 | Schneider | |
| 2002/0116107 A1 | 8/2002 | Mahoney et al. | |
| 2005/0146428 A1 | 7/2005 | Mahoney et al. | |
| 2005/0216151 A1 | 9/2005 | Gawlik et al. | |
| 2006/0030990 A1 | 2/2006 | Anderson et al. | |
| 2006/0282467 A1 | 12/2006 | Peterson et al. | |
| 2007/0093925 A1 | 4/2007 | Moughler | |
| 2007/0156318 A1 | 7/2007 | Anderson et al. | |
| 2007/0239337 A1 | 10/2007 | Anderson | |
| 2008/0005177 A1 | 1/2008 | Steckel et al. | |
| 2008/0140431 A1 | 6/2008 | Anderson et al. | |
| 2009/0198422 A1 | 8/2009 | Vik et al. | |
| 2009/0313215 A1 | 12/2009 | Maizel et al. | |
| 2010/0100315 A1 | 4/2010 | Davidson et al. | |
| 2010/0100507 A1 | 4/2010 | Davison et al. | |
| 2010/0324955 A1 | 12/2010 | Rinehart et al. | |
| 2011/0270724 A1 * | 11/2011 | O'Neil ................... | G06Q 30/04 705/34 |
| 2012/0109520 A1 | 5/2012 | Hood et al. | |
| 2012/0256763 A1 | 10/2012 | Johnson et al. | |
| 2013/0173321 A1 | 7/2013 | Johnson | |
| 2014/0172225 A1 * | 6/2014 | Matthews ............ | G05D 1/0274 701/25 |
| 2014/0249893 A1 | 9/2014 | McClure et al. | |
| 2015/0234767 A1 | 8/2015 | Tatge et al. | |
| 2016/0071410 A1 | 3/2016 | Rupp et al. | |
| 2016/0232621 A1 | 8/2016 | Ethington et al. | |
| 2016/0334804 A1 | 11/2016 | Webber et al. | |

OTHER PUBLICATIONS

Shamshiri, Ramin and Ismail, Wan Ishak Wan; Exploring GPS Data for Operational Analysis of Farm Machinery; Research Hournal of Applied Sciences, 2013; Eng. and Technology 5(12); 3281-3286; 6 pages; University of Putra Malaysia, Selangor Malaysia.

Schemper, Janel K.; Efficiency of Combine Usage: A Study of Combine Data Comparing Operators and Combines to Maximize Efficiency; Thesis submitted to Department of Agricultural Economics College of Agriculture, Kansas State University; Manhattan, Kansas; 2014; 50 pages.

Pfeiffer, Dohn, and Blank, Sebastsian; Real-time Operator Performance Analysis in Agricultural Equipment; Conference Paper; Nov. 2015; found on-line at https://www.researchgate.net/publication/283643214; 7 pages.

Bennett, Jeffrey D.; Value of Map Sharing Between Multiple Vehicles in the Same Field While Using Automated Section Control; Thesis submitted to Department of Agricultural Economics College of Agriculture; Kansas State University; Manhattan, Kansas; 2016; 60 pages.

* cited by examiner

Summarized Agricultural Geospatial Data Events:

| Event Number | Equipment ID | Equipment Name | Start Date | Finish Date | Total Pass Time (hr) | Distance Covered (ft) | Average Speed | Fuel Used (gal) | Average Engine Load (%) |
|---|---|---|---|---|---|---|---|---|---|
| 1 | 1 | Tractor 1 | 2016-04-09 21:48:43 | 2016-04-11 13:13:22 | 4.78 | 78612.3 | 4.13 | 41.2 | 66.6 |
| 2 | 2 | Tractor 2 | 2016-04-10 18:35:26 | 2016-04-11 00:56:59 | 0.96 | 25838.7 | 5.56 | 3.8 | 49.1 |
| 3 | 3 | Sprayer 1 | 2016-05-07 17:46:36 | 2016-05-07 19:03:13 | 1.28 | 44294.3 | 8.19 | 7.7 | 47.1 |
| 4 | 1 | Tractor 1 | 2016-05-22 18:52:31 | 2016-05-23 02:42:27 | 3.12 | 54089.7 | 4.61 | 40.7 | 50.2 |
| 5 | 2 | Tractor 2 | 2016-06-09 19:06:10 | 2016-06-09 19:41:12 | 0.38 | 3880.1 | 1.89 | 1.3 | 38.6 |
| 6 | 3 | Sprayer 1 | 2016-06-11 15:08:42 | 2016-06-11 16:42:22 | 1.56 | 41617.8 | 7.38 | 7.0 | 40.4 |
| 7 | 3 | Sprayer 1 | 2016-06-16 15:54:29 | 2016-06-16 17:50:29 | 1.93 | 43934.4 | 6.89 | 7.2 | 35.2 |
| 8 | 4 | Combine 1 | 2016-10-03 08:29:15 | 2016-10-03 17:51:12 | 9.37 | 136837.0 | 4.89 | 76.5 | 71.2 |

FIG. 8

Planned Chronological List of Equipment Operation Events:

| Operation Event Number | Operation Event Name | Equipment ID | Equipment Name | Start Date | Finish Date | Total Pass Time (hr) | Distance Covered (ft) | Average Speed (mph) | Fuel Used (gal) | Average Engine Load (%) |
|---|---|---|---|---|---|---|---|---|---|---|
| 1 | Spray Pre-Emerge | 3 | Sprayer 1 | - | - | 1.10 | 29330.4 | 10.00 | 6.0 | 40.0 |
| 2 | Plant Corn | 1 | Tractor 1 | - | - | 3.20 | 58660.8 | 5.00 | 40.0 | 65.0 |
| 3 | Sidedress Corn | 2 | Tractor 2 | - | - | 2.50 | 58660.8 | 6.00 | 33.0 | 35.0 |
| 4 | Spray Post Emerge | 3 | Sprayer 1 | - | - | 1.10 | 29330.4 | 10.00 | 6.0 | 40.0 |
| 5 | Spray Fungicide | 3 | Sprayer 1 | - | - | 1.10 | 29330.4 | 10.00 | 6.0 | 40.0 |
| 6 | Harvest Corn | 4 | Combine 1 | - | - | 8.00 | 117321.6 | 5.00 | 70.0 | 80.0 |

FIG. 11

MACHINE CONTROL SYSTEM PROVIDING ACTIONABLE MANAGEMENT INFORMATION AND INSIGHT USING AGRICULTURAL TELEMATICS

RELATED APPLICATION

This application claims the benefit of U.S. Provisional Patent Application Ser. No. 62/536,026, entitled Actionable Management Information and Insight System for Agricultural Telematics (AMIISAT), filed on Jul. 24, 2017, and is a Continuation-In-Part of U.S. patent application Ser. No. 15/490,791, (now U.S. Pat. No. 10,368,475) entitled Machine Guidance for Optimal Working Direction of Travel, filed on Apr. 18, 2017, the contents of which are incorporated herein by reference in their entirety for all purposes.

BACKGROUND

Technical Field

This invention relates to a machine control system for agricultural equipment, and more specifically, to a system and method that uses real-time, or near real-time, adaptive analysis to provide actionable management information and operational directives to agricultural machines using agricultural geospatial data.

Background Information

Actionable information and insights to anyone associated with performance metrics on an operating farm, including equipment operators, farm managers, and farm owners, is vital in order for the best management decisions to be made. Not only do operating farms have decisions to make, but sectors such as the agricultural retail sector of the industry also have to manage decisions involving equipment performance metrics. A major source of difficulty in this management can be attributed to properly managing the associated operating equipment and the corresponding data that it can generate. Equipment logistics, usage, and cost, as well as operating metrics like machine data, agronomic data, and monitor/controller data are just a few examples of parameters that may need to be evaluated in order to help with those decisions. The collection and analysis of this geospatial data can also take many man hours and be computationally expensive in current farm management information systems.

The current collection and analysis process of said geospatial data usually includes first collecting the data from a multitude of different sources, e.g., from a portable storage medium such as a USB flash drive or an external hard drive, cloud/web application data services, data storage from databases, as well as directly from collection devices. These data sources have historically collected and stored the data from the incoming data streams so that further processing may be done at a later time. The data sources are also usually located in many different places, both physically and in terms of connected networks, and therefore are not directly part of a centralized system. They are also, very often, unstandardized in terms of the type of data that is stored. Stored data types for agricultural data may include field boundary data, agronomic data, machine, agronomic, or monitor/controller telematics data, as well as farm equipment information which may include, equipment financial information, equipment configurations, and the various potential activities/uses of said equipment. These different data types are often also stored in different data formats corresponding to different file types. The case often exists where even different data formats and file types may occur for the same data type if the data originates from different collection sources. Due to this, the incoming data must be retrieved, standardized, and merged in order to provide relevance. In order to provide this sort of context, which also helps to make the data actionable, the data must first be organized to determine which of the data is performing operational work. The non-operational category is any data that is not considered to be performing work on a given geospatial geometry of the farm. After the data has been classified, it must then be analyzed in order to create enough significant context in order for actionable information and insights to be generated. Once this context has been generated, further farm models, capacity, and financial business logic may be applied to help extend the information and insights provided.

The actual analysis process used to classify, assign, and aggregate the data is often rigorous and manual by nature, but must occur in order to provide the necessary context for accurate analysis. Processing the large amount of telematics data along with said equipment configurations, and the various potential activities/uses of said equipment for all geospatial events, over all geospatial geometries, for all potential scenarios becomes extremely expensive in terms of computational power, time, and efficiency. This process, then, only becomes more complicated and expensive when data must be processed for multiple farms or agricultural retail operations.

Not only is the current process computationally expensive and inefficient, but the tools and skills required to the complete the analysis are often numerous. Tools such as geographic information systems (GIS) software, data processing software, and data visualization software are required to complete the analysis from start to finish. With the increasing complexity in farm management situations and as the amount of data and potential scenarios increase, it can make these tools very time consuming to use. The skillset needed to operate these different software packages along with the skillset to physically move the data from one to another is also one that not all equipment operators, farm managers, or farm owners possess. Due to this, it could potentially leave these operators, managers, and/or owners at a competitive disadvantage when it comes to making decisions with the data.

Therefore, a need has been shown for a system and process that addresses and improves upon the aforementioned issues.

SUMMARY OF THE INVENTION

The appended claims may serve as a summary of the invention. The features and advantages described herein are not all-inclusive and various embodiments may include some, none, or all of the enumerated advantages. Additionally, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 8 is an example of the summarized agricultural geospatial data events for a field boundary.

FIG. 11 is an example of the planned chronological list of equipment operation events for a field boundary.

DETAILED DESCRIPTION OF THE INVENTION

Figure 1:
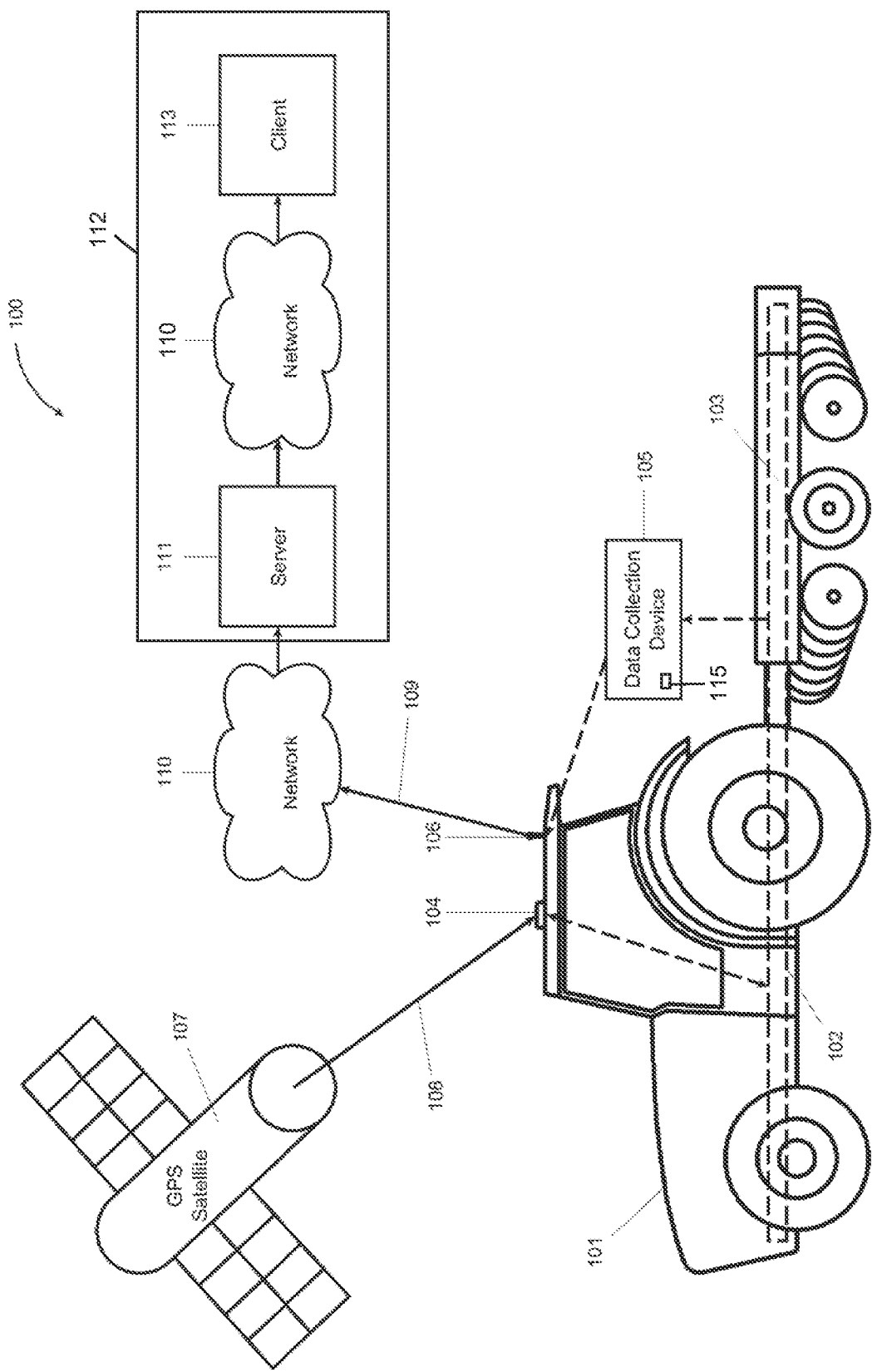
FIG. 1 illustrates a diagram of agricultural geospatial data collection and transfer through the use of a cloud enabled network to a guidance system, which contains an embedded remote server-client architecture, coming from agricultural equipment with data collection capabilities, in accordance with embodiments of the present invention.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Additionally, unless otherwise specifically noted, articles depicted in the drawings are not necessarily drawn to scale. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

An aspect of the present invention was the realization by the instant inventors that without the association of the data to the proper geospatial geometry (field boundary or significant location) as well as to the geospatial event (operation), the use of the data is limited as to the information and insights that it is able to provide. It was further recognized that in order to make these assignments, knowledge of the location of the geospatial geometries, the equipment and their configurations, and temporal aggregation techniques must be known. As many farms contain a plurality of geospatial geometries, as well as many geospatial events that occur at or on each of these geospatial geometries, the classification, assignment, and aggregation process tends to be very complicated. That combined with the potential for an extremely large amount of incoming data, from different sources, can also make efficient use of such data extremely difficult.

The instant inventors recognized that in agriculture, a majority of the time equipment is driven from work location to work location, such as from field to field, to perform operational work. During this travel period, extra time, distance, and fuel, just to name a few, are being accrued which affects the logistics, the overall farming operation, and its associated costs. This is especially true in cases such as farms with fields that are spread out over a large area, or pieces of equipment like a self-propelled sprayer that may make many trips to fields throughout the growing season. Without analyzing travel data, and the associated time and money that it attributes to the equipment and the total farming operation, a complete picture of equipment usage and its effects cannot be seen. This incomplete picture of equipment usage could potentially lead to uninformed management decisions. The same holds true with any geospatial data resulting as ancillary to the operational or travel data. The time and money accrued when the equipment is active in the barnyard, for example, must also be accounted for in order to obtain a comprehensive look at all equipment activities and their costs.

The prior art known to the present inventors does not focus on the classification of agricultural geospatial data in an adaptive manner. As used herein, the term "adaptive" refers to the concept that the geospatial data itself, using its own measured parameters, provides a basis for the classification outcome. The known prior art also fails to discuss dynamically classifying/matching summarized data events to an agricultural operations model. The instant inventors further recognized that classifying summarized geospatial data events to an operations model, e.g., matching actual operation events to planned operation events, or assigning operation information to operation events, starts turning the data into something actionable. As operation type, and individual operations, are categories within which farms make decisions, having information in these terms may prove to be a management advantage. This, coupled with dynamically re-classifying and re-evaluating the data, as any portion of the agricultural operation model changes, to provide substantially real-time or near real-time results, may provide an immediate advantage to the farming operation. In many applications, these aspects may improve the quality of the information and insights generated, the actionable decisions made, and ultimately the overall performance and bottom line of the farming operation as a whole.

Therefore, the inventive embodiments discussed hereinbelow provide a system and method that generates actionable management information, insights, and operational directives from telematics and agricultural geospatial data through a passive, automated, adaptive, and dynamic process.

More specifically, these embodiments provide for: the passive collection and transfer of agricultural geospatial data, via telemetry, from active agricultural equipment; the automatic and adaptive classification of collected geospatial data into aggregated operational, travel, and ancillary data events; the summarization of said aggregated operational, travel, and ancillary data events; the methods of dynamically classifying/matching the summarized data events to an agricultural operations model for the dynamic generation of actionable management information and insights in real-time, in-season, and/or historically; and the transfer of this information to an agricultural machine in the form of operational directives.

As discussed in greater detail hereinbelow, agricultural geospatial data may be collected from a collection device that is communicably coupled to an equipment system bus for the gathering of data that is being communicated on the equipment's functional systems. This data may then be transmitted, via telemetry, to a cloud enabled network, and then to a server for analysis in the system. The agricultural geospatial data may also be collected from sources that are not directly within the centralized analysis system but have already stored raw data, such as geospatial data databases, or external storage media such as a USB flash drive or external hard drive. These data sources may also be accessed so that both incoming data collected from collection devices and external sources may be analyzed with the adaptive data analysis algorithm. The algorithm may adaptively classify the agricultural geospatial data into operational, travel, or ancillary categories as the data is arriving into the system for effective processing and storage of the incoming data, or after the data has been stored. The algorithm also assigns the classified data to a geospatial geometry, such as a field boundary or a significant location to the farming operation. The algorithm is then able to aggregate and summarize the classified and assigned data in order to create summarized agricultural geospatial data events for each of the three classifications and for all known geospatial geometries. This adaptive classification analysis may be completed with only the help of the geospatially located geometries and the agricultural geospatial data itself, which contain the necessary information for classification. Through a geospatial relation of the agricultural geospatial data and the geospatial geometries, as well as parameters from the agricultural geospatial data, classification to operational, travel, and ancillary activities may occur. In this way field boundaries and/or significant locations associated with the farm may be evaluated. A temporal analysis may then be completed within the algorithm to aggregate the classified agricultural geospatial data and summarize the results in order for the generation of summarized geospatial data events.

The agricultural geospatial data events may also be transferred, via a communication network, to a client for further processing in a dynamic classification algorithm. This algorithm may use the help of an agricultural operations model, as well as capacity, financial, and/or business logic to generate further information and insights on the contextualized geospatial data. Management categories such as, business farm entities or clients, land ownership entities or farms, fields, operation event types, specific operation events, and/or specific equipment may be used with information and insights generated from the geospatial data to help make actionable management decisions on the farm.

In particular embodiments, the agricultural operations model also provides a chronological list of operation events that have been pre-planned and contain similar summarization characteristics, including cost of operation parameter characteristics. These summarized operating characteristics may then be used to classify the agricultural geospatial data events into either an event that matches an event in the planned list of events, one that doesn't match any in the planned list of events, or one that is not found in the planned list of events. These insights and information may then also be used by farm managers to help them make actionable management decisions on the farm.

Terminology

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Where used in this disclosure, the term "computer" is meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server" and "client", and the like are intended to refer to a computer-related entity, including hardware or a combination of hardware and, software. For example, an engine may be, but is not limited to being: a process running on a processor; a processor including an object, an executable, a thread of execution, and/or program; and a computer. Moreover, the various computer-related entities may be localized on one computer and/or distributed between two or more computers. The terms "real-time" and "on-demand" refer to sensing and responding to external events nearly simultaneously (e.g., within seconds, milliseconds, or microseconds) with their occurrence, or without intentional delay, given the processing limitations of the system and the time required to accurately respond to the inputs. The terms "near real-time" and "near on-demand" also refer to the sensing and responding to external events that may be close to simultaneous, or near simultaneous, (e.g., within hours, minutes) with their occurrence, or without intentional delay, given the processing limitations and data flow capacity of the system to accurately respond to the inputs. The terms "real-time" and "near real-time" depend on the system and the capacity provided to the system for processing and data movement. They should in no way limit the scope in which the invention is presented herein.

Programming Languages

Embodiments of the present invention can be programmed in any suitable language and technology, such as, but not limited to: Assembly Languages, C, C++; C#; Python; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400, as well as big data and NoSQL technologies, such as, but not limited to, Hadoop or Microsoft Azure. Referring now to the attached Figures, embodiments of the present invention will be more thoroughly described.

FIG. 1 shows a centralized system 100 that illustrates the passive agricultural geospatial data collection and transfer for the generation of actionable management information and insights, which in particular embodiments, includes a work machine 101 communicably coupled via a cloud enabled network 110, to a guidance system 112, e.g., in a server 111/client 113 architecture as shown. The system 100 contains agricultural equipment 101 with an equipment system bus 102, e.g., in the form of a conventional Controller Area Network (CAN) bus, that allows interaction with the different systems on-board that control, operate, and monitor the equipment. Also connected to the equipment system bus 102 are a GPS receiver system 104, a data collection device 105, and a wireless data transfer device system 106. A GPS receiver system 104 connected to the equipment bus system 102 allows for GPS signals 108 being transmitted via GPS satellites 107 to be received and sent to the equipment bus 102 for GPS-based positioning control of the equipment. The GPS receiver system 104 also allows for the GPS signal data 108 to be combined/matched with the equipment system bus data 103 which creates agricultural geospatial data 109, that may contain but should not be limited to, GPS positioning data, temporal data, machine and equipment data, agronomic data, monitor/controller data, or any other equipment sensor data. The passive agricultural geospatial data collection device 105 may be connected wirelessly or through a physical connection to the equipment system bus 102 as well as to the data transfer device system 106. The passive agricultural geospatial data collection device 105 may monitor the equipment system bus 102 without interfering with the operation of the equipment system bus 102 while also measuring the agricultural geospatial data 109 that is transmitted to the different systems. The agricultural geospatial data 109 may then be transferred, via the transfer device system 106, to a cloud enabled network 110. Once the agricultural geospatial data 109 has been transferred to the cloud enabled network 110, the data 109 can then be transferred to a server 111 in which an adaptive data analysis algorithm can be completed. The result of the adaptive data analysis algorithm can then be sent, via a communication network 110, to a client 113 for the dynamic classification algorithm to be completed and actionable management information and insights to be generated.

In alternate embodiments of the data collection device 105, the device 105 may both monitor the equipment system bus 102 and measure the equipment system bus data 103 without the GPS signal data 108. The data collection device 105 may contain a GPS receiver system 104 within the device system 105 so that GPS signal data 108 may be directly measured by the data collection device 105 and combined/matched with the equipment system bus data 103 at the data collection device 105 before transfer of the agricultural geospatial data 109 by the transfer device system 106 occurs. Data collection device 105 may also contain the transfer device system 106 within itself, so that agricultural geospatial data 109 may be collected and transferred by the same device 105. The data collection device 105 may also have the ability to interact with the equipment system bus 102 to control specific systems residing on the bus for input from external controlling systems. It should also be recognized that a combination of this system may have not been discussed within this explanation, but known that an alternate embodiment of the description may be possible while still representing the concepts and figures presented herein.

In another alternate embodiment, the data source that is connected to the cloud enabled network 110 and to the server 111 may not come directly from the data collection device 105 on the agricultural equipment 101. The agricultural geospatial data 109 may be from a multitude of different sources that have historically collected agricultural geospatial data 109 or are connected via cloud/web application data services. These sources may include, for example, portable storage media such as USB flash drives or external hard drives, web application data services, and data storage databases. In various embodiments of potential agricultural geospatial data 109 storage, a connection to the server 111, through a cloud enabled network 110 or physical connection, is made and becomes a part of the centralized system 100 shown.

FIG. 1 also shows just an example of a simplified, and specific, embodiment of an agricultural telematics system 100 that is based on a client-server architecture. This by no means, should limit the concepts herein, as other potential embodiments of this telematics system 100 may include configurations of, just a server for all processing, just a client for all processing, a combined server-client unit, or any type of architecture that allows the processing and analyzing of data to flow from agricultural equipment 101 to farm managers.

Figure 2:
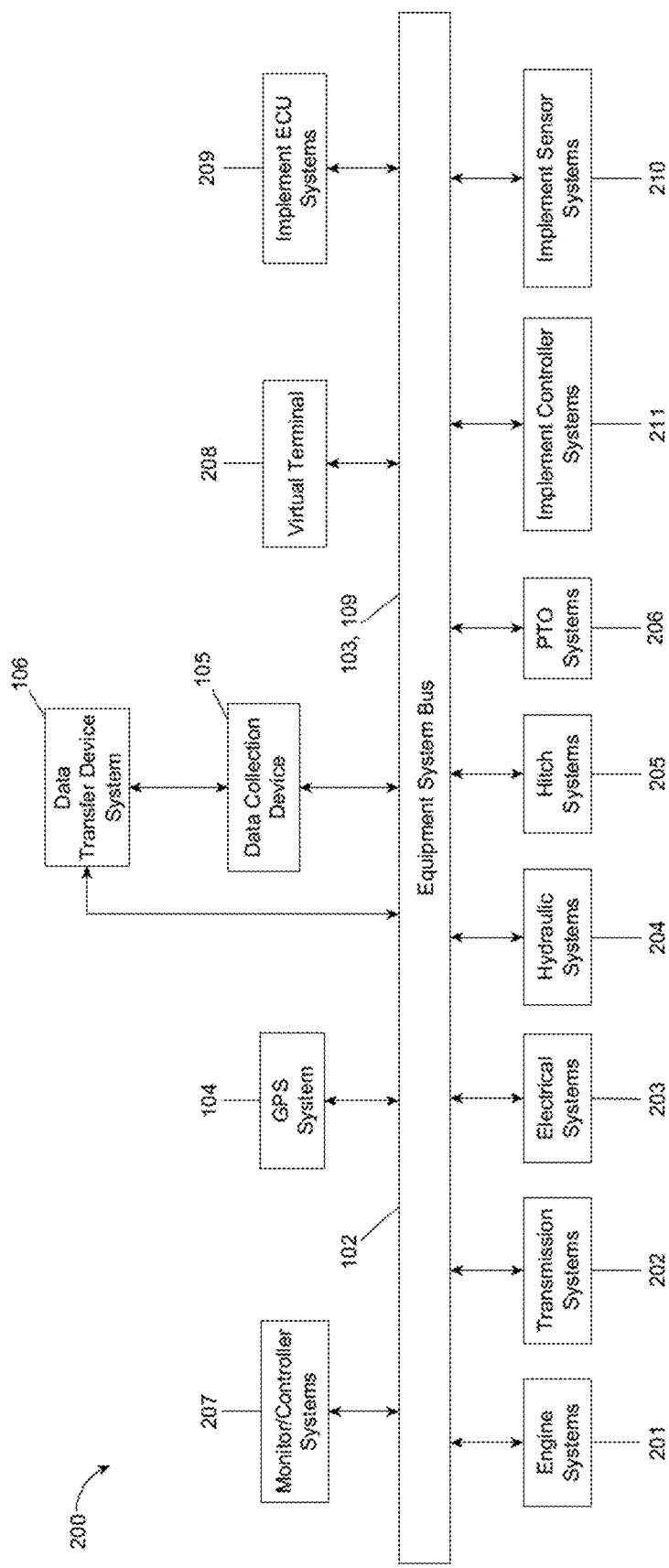
FIG. 2 illustrates a simplified diagram of an equipment system data transfer bus that resides on typical agricultural equipment to allow for data collection, transfer, and control.

FIG. 2, then, shows an equipment system bus 102 with a more detailed level 200 of the on-board systems associated with agricultural equipment 101. The system contains a centralized data bus 102 that allows the transfer of data 103 109 to and from different systems contained on the agricultural equipment 101. The equipment system bus 102 may be one, or a combination of data buses that should not be limited to, a controller area network (CAN) like CAN bus and ISO bus, Local Interconnect Network (LIN), Ethernet, Transmission Control Protocol (TCP)/Internet Protocol (IP), RS232, CCD, Universal Serial Bus (USB) or any other connection between the equipment operating systems that can transfer data back and forth to the controlling systems.

Systems such as the engine 201, transmission 202, electrical 203, hydraulic 204, hitch 205, power take-off (PTO) 206, and the monitor/controller system 207, as well as the virtual terminal 208, any implement ECU systems 209, implement sensor systems 210, and implement controller systems 211 are examples of what may be connected to the centralized equipment bus 102 but in no way should be limited to only these. The functionality of this data bus 102 allows for data 103 109 flow between systems so proper functionality of the agricultural equipment 101 may occur. The data 103 109 passed through this bus 102 can originate or be received from the different systems through a standard data flow protocol for agricultural equipment 101. It also provides the opportunity for a data collection device 105 to be used to gather the geospatial data 109, or just the equipment system bus data 103, and then send it to a cloud enabled network 110 using a data transfer device 106 for further analysis. The data collected 103 109 may comprise of information from one or multiple systems provided in 200 as well as systems that may not be visualized within this diagram. The data collection device 105, once again, may be a passive non-intrusive device that connects to existing systems or directly to an equipment system bus 102 to record information of the equipment operating parameters, as well as a device that can provide input to the equipment system bus 102 for control of specific systems within or on the bus.

Figure 3:
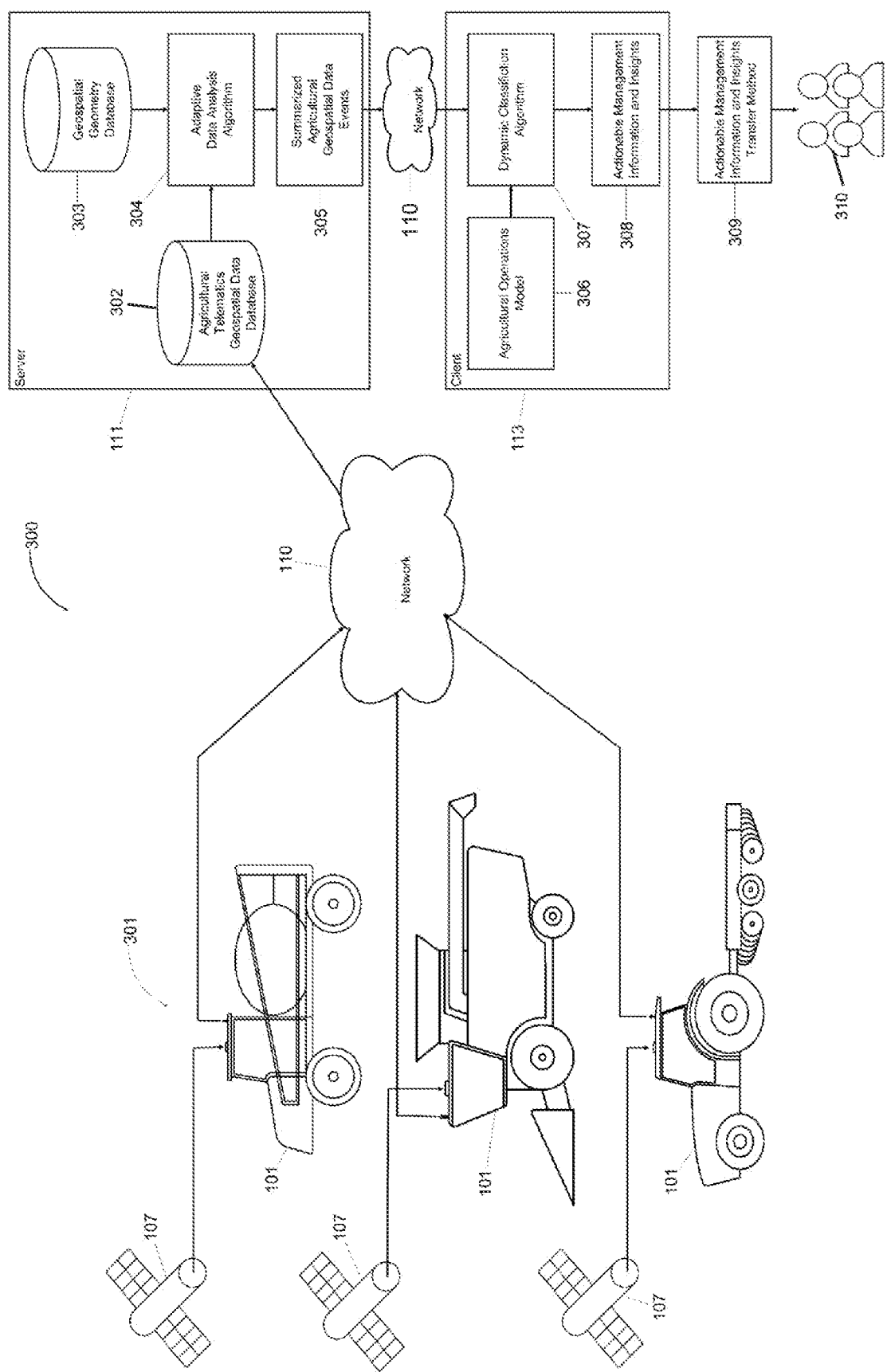
FIG. 3 illustrates a system of the collection and transfer of agricultural geospatial data from a group of agricultural equipment as well as the process and method of the generation of actionable management information and insights.

FIG. 3 shows this collection in a simplified diagram of a system 300 that includes multiple pieces of agricultural equipment 101 of multiple types 301, including substantially any type of work machine operating substantially any type of farm implement. A representative (non-exclusive) list of work machines usable with these embodiments includes: Tractors, Combines, Powered Applicators (sprayers, spreaders, floaters), Bulk Harvesters (self-propelled forage harvesters, cotton harvesters, sugar beet harvesters, etc.), Self-Propelled Windrowers and Swathers, Skid-Steer Loaders, Semi-Trucks, Utility Vehicles, and Passenger Vehicles (for farm use—such as pickup trucks). A representative (non-exclusive) list of farm implements (tools) usable with these embodiments includes: Tillage Tools, Planters, Air Seeders, Drills, Balers, Grain Carts and Bulk Storage Carts, Forage Preparation Tools (Conditioners, Rakes, Tedders, etc.), Pull-type Applicators (pull type fertilizer spreaders or sprayers), Trailers/Wagons/Seed Tenders, Pull-type Harvesters (forage harvesters that are pulled), and Manure Spreaders.

FIG. 3 also shows the flow of agricultural geospatial data 109 from collection to the generation of actionable management information and insights (also referred to herein as "management insight(s)", "actionable insight", or simply "actionable information") 308. It should be noted that system 100 may automatically determine the type of equipment or implement being used, based on the data captured by data collection device 105, and/or by use of an implement sensor 115 communicably coupled to device 105. FIG. 3 further shows the transfer 309 of this actionable information and insights 308 to the farm managers/working machine operators 310, which may take the form of information displays as well as operational directives sent by system 100. As discussed in detail hereinbelow, examples of actionable information include the amount of time the working machine was idle during performance of various geospatial events, the costs per acre associated with various geospatial events, correlation of speed of working machine to costs associated with various geospatial events, cost savings per acre as a function of speed of the working machine, and combinations thereof. An exemplary operational directive includes instructions to increase or decrease the speed of the working machine to match an optimal speed generated by the model for a particular geospatial event. Other exemplary operational directives may include, but should not be limited to: instructions to shift gears of a machine and reduce engine speed through throttle adjustment of the engine in order to reduce fuel use rate, to reduce fuel cost for a particular geospatial event; instructions to optimize field efficiency of a particular geospatial event by providing instructions on obtaining an optimal work direction of travel within the field boundary, such as shown and described in the above-referenced U.S. patent application Ser. No. 15/490,791; or providing instructions to turn the machine off during non-productive times to reduce fuel cost and cost of operation when the machine is not being productive. As these operational directives have been explicitly stated, it should be known to those skilled in the art that this is only a small subset of the potential operational directives that could be generated for machine control for a particular geospatial event. For example, parameters such as engine speed, engine load, distance travelled, fuel usage, as well as other machine, agronomic, or monitor/controller data may be used to generate these operational directives.

In this regard, embodiments of system 100 are configured to automatically determine the particular geospatial event being performed, and to provide the operational directive, in real-time, or near real-time. The geospatial data 109 collected from the set of agricultural equipment 301 is connected to the cloud enabled network 110 that is connected to a server 111. This server 111 contains a database 302 of the agricultural geospatial data that is collected from the data collection device 105, e.g., including location data captured from GPS 104, and operational data captured from the CAN bus of the work machine 101, as well as a database 303 that includes geospatially located geometries, e.g., field geometries, for the operating farm. The server 111 also contains an adaptive data analysis algorithm 304 that processes and analyzes the agricultural geospatial data 109 from the telematics geospatial data database 302 using the geospatially located geometries database 303, as a reference, to create the summarized agricultural geospatial data events 305 for the operational, travel, and ancillary categories. These summarized data events 305 may then be transferred, via a communication network 110, to a client 113 for further processing.

In embodiments, the communication network 110 may be, but should not be limited to, a wireless or wired network, that may include networks such as, Local Area Network (LAN), Wide Area Network (WAN), the Internet, an Ethernet connection, Universal Serial Bus (USB), Wi-Fi, or Bluetooth for example. Moreover, the client 113, in this embodiment, may include any device that contains a processor and or a means of viewing information, for example, but should not be limited to, devices such as, a laptop or desktop computer, a smartphone, or a tablet.

In this specific embodiment, as depicted in FIG. 3, the client 113 receives the summarized agricultural geospatial data events 305 which may then be dynamically classified, i.e., matched, using the dynamic classification algorithm 307 in relation to an agricultural operations model 306. As the dynamic classification algorithm 307 classifies the actual geospatial data events 305 the algorithm 307 also generates actionable management information and insights 308 that may then be transferred, via a transfer method 309, to the farm managers 310 for quick and easy access in order to help make timely and efficient management decisions.

As an alternate embodiment of FIG. 3, and specifically of server 111, the agricultural geospatial data 109 may also be transferred via the cloud enabled network 110 directly to the adaptive data analysis algorithm 304 for analysis before storage in the agricultural telematics geospatial database 302. In such an embodiment, agricultural geospatial data 109 may once again come from a multitude of external sources and/or agricultural equipment 101.

Figure 4:
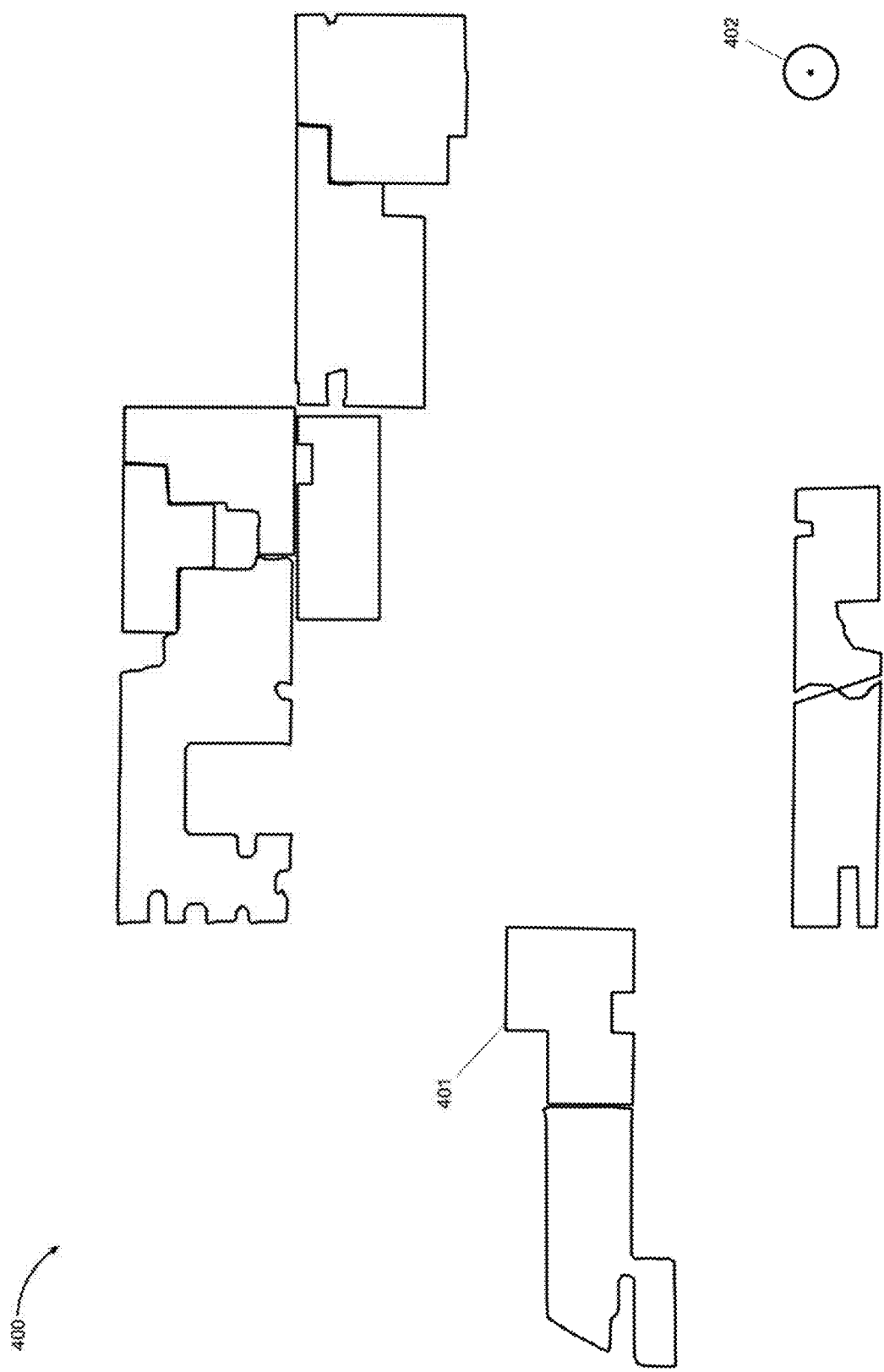
FIG. 4 illustrates a diagram displaying a collection of geospatial geometries.

A factor in evaluating agricultural geospatial data 109 is not only being able to associate the geospatial data 109 with the proper agricultural equipment 101 but also to associate that equipment 101 with its geospatial location in regards to geospatial geometries such as, field boundaries and significant locations associated with a farm. FIG. 4 provides a visualization of multiple geospatial field boundaries 401, along with a significant location that has been marked by the farm and is designated as 402. Significant locations 402 may represent, but should not be limited to, staging areas, storage areas, or any location that has been marked as geospatially significant to the farm operation in one way or another. Collectively these geometries create a set of geospatial data geometries 400 that can be referenced as a whole farm. This set of geometries 400 play a role in being able to properly locate, attribute, and adaptively classify the geospatial data 109 collected from equipment 101 into operational data of field boundary 401, travel to or from field boundary 401 or location 402, or into ancillary data of field boundary 401 or location 402, for example. These geometries 400 are captured by system 100, such as by uploading a computer file, such as a map, containing the geometries 400 therein. Alternatively, system 100 may use the GPS receiver 104 to capture GPS coordinates of the boundaries and topographical features of a field as the agricultural work machine 101 traverses the field, e.g., as the machine circumnavigates the field(s).

Figure 5:
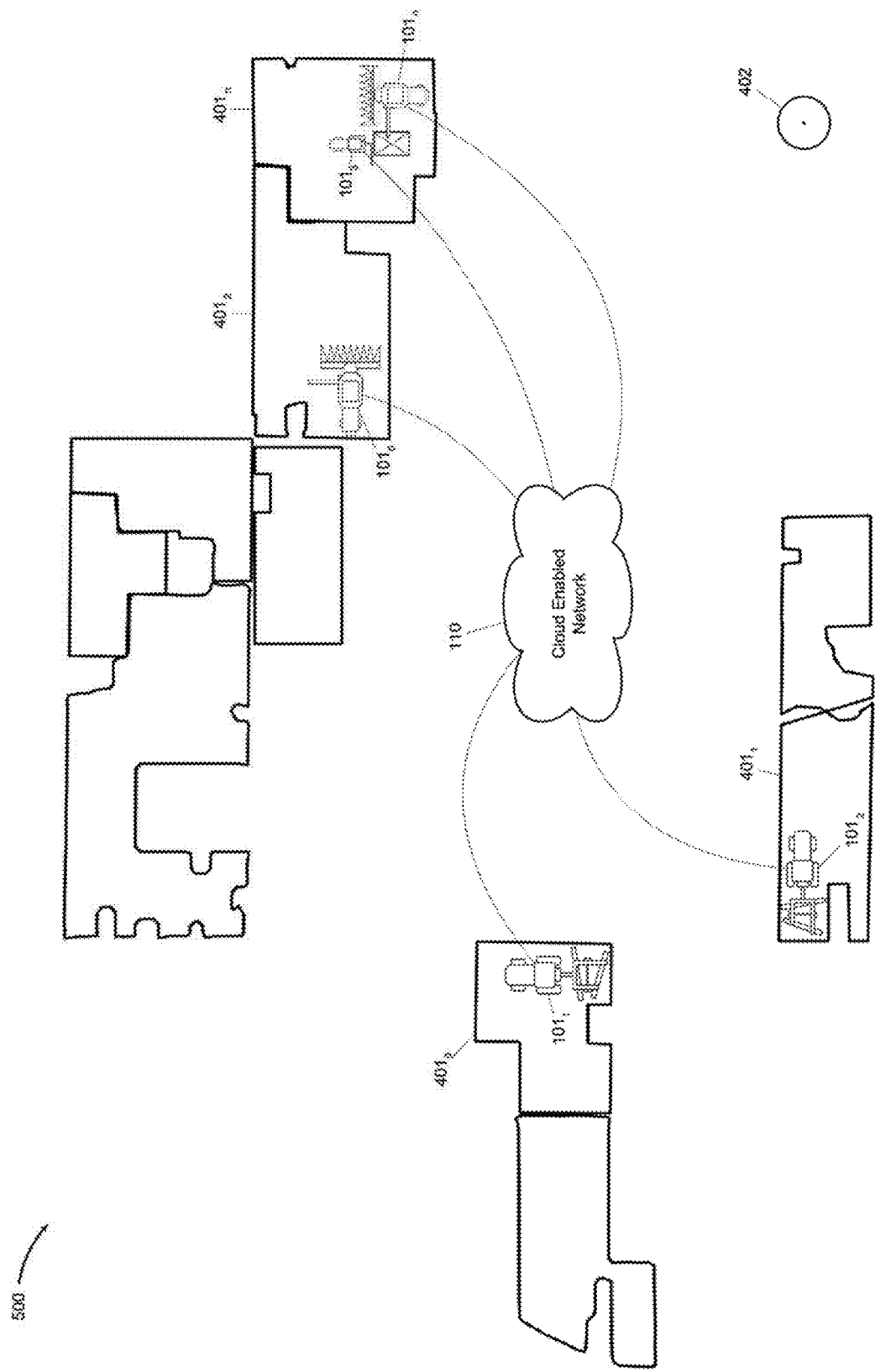
FIG. 5 illustrates a diagram displaying agricultural equipment performing field operation events on multiple geospatial geometries while transmitting agricultural geospatial data to a cloud enabled network.

FIG. 5 also shows the farm with the set of geospatial geometries 400 but now with equipment operation on those field boundaries 500. The work operations that equipment $101_{0\ to\ n}$ are performing may all occur at the same time, individually, or in any combination of occurrence in regards to time and location. FIG. 5 also shows the data collection of the operating equipment 101 in all of the field boundaries $401_{0\ to\ n}$ transferring each equipment's 101 individual agricultural geospatial data 109 to the cloud enabled network 110 for further processing.

Figure 6:
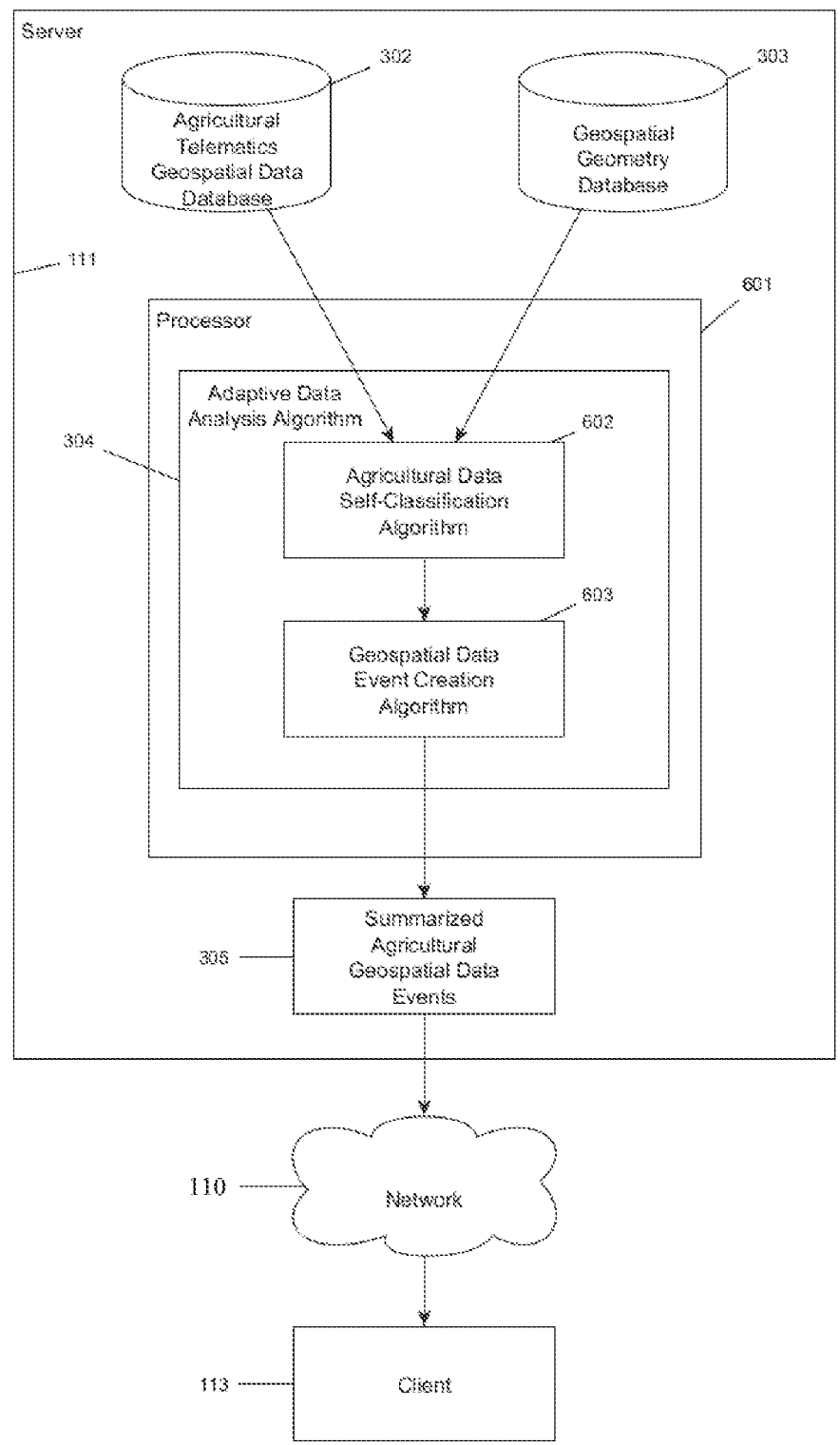
FIG. 6 is a detailed block diagram of the server.

This further processing may occur on the server 111 and can be shown in greater detail in the block diagram in FIG. 6. The server system 111 contains the agricultural telematics geospatial data database 302, the geospatial geometry database 303, a processor 601 that may be able to perform algorithmic computer code/instructions, which contain the adaptive data analysis algorithm 304, and the summarized agricultural geospatial data events 305 that are created from the adaptive data analysis algorithm 304. Within the processor 601, the agricultural geospatial data 109 from the database 302 along with the geospatially located geometries 303 flow together into the agricultural data self-classification algorithm 602 so the agricultural geospatial data 109 may be parsed into operational, travel, and ancillary classifications for every field 401 and/or location 402. The data can then be aggregated and summarized in the geospatial data event creation algorithm 603 in order for the data events 305 of every field boundary 401 and/or location 402 to be created.

In an alternate embodiment of server 111, agricultural geospatial data 109 may be directly fed into the adaptive data analysis algorithm 304 from the communication network 110. In this way the agricultural data would flow just with the geospatial geometries 303 into the self-classification algorithm 602 e.g., without first being stored in databases 302, 303. The incoming data 109 may then again be parsed and classified into operational, travel, and ancillary categories for all geospatial geometries stored in 303. At this point, the classified data may then be stored in agricultural database 302. Other alternate embodiments of server 111, with a restructured path of data flow and storage may also be recognized by those skilled in the art. While the location of data flow and storage may differ along the data pipeline than what is shown in the figures or otherwise presented herein, it should not limit the scope of the invention as set forth in the claims hereof.

Figure 7:
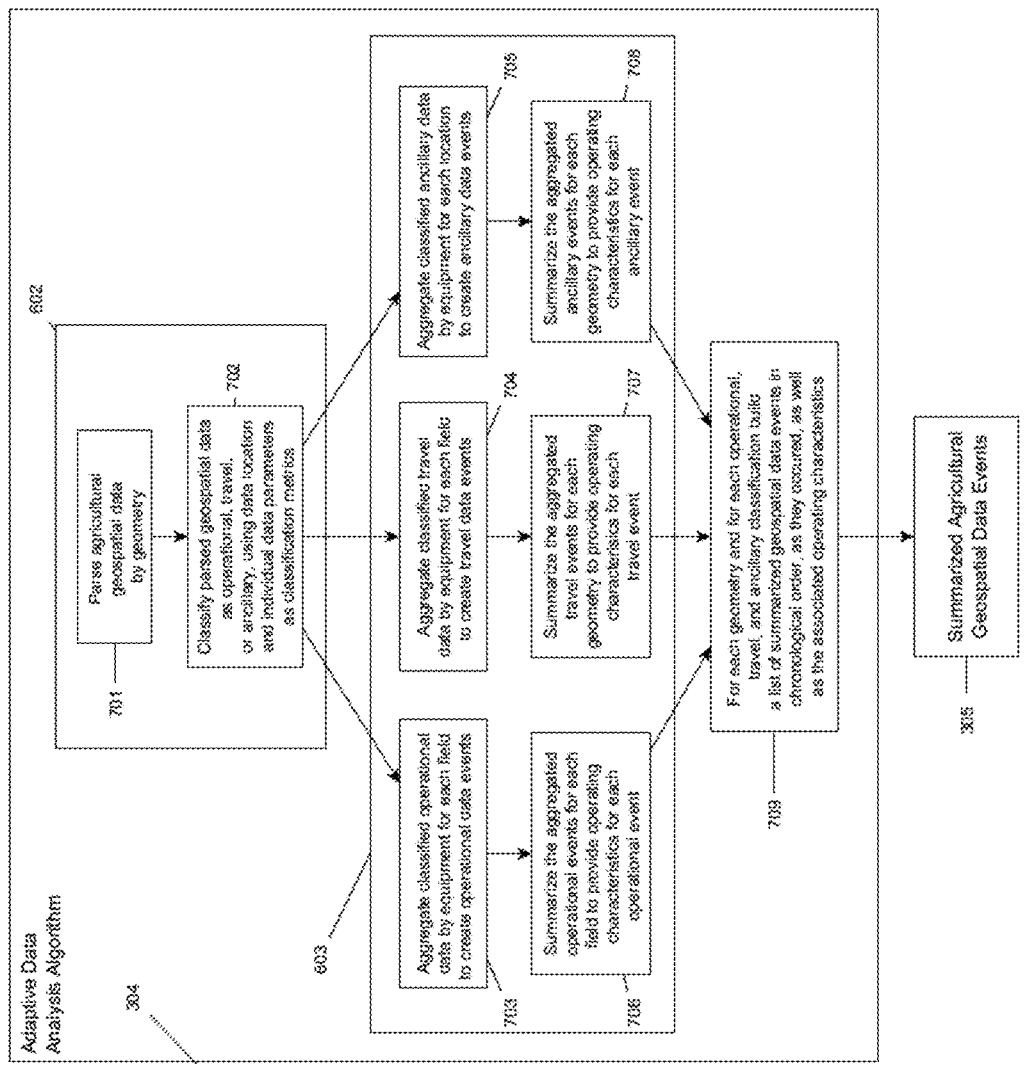
FIG. 7 is a detailed block diagram of the adaptive data analysis algorithm which details the creation of the summarized agricultural geospatial data events.

In particular embodiments, this process can yet further be defined in FIG. 7 which shows a more detailed block diagram of the adaptive data analysis algorithm 304. It contains the methods of the agricultural data self-classification algorithm 602 to adaptively analyze the agricultural geospatial data 109 from the agricultural geospatial database 302. In step 701 the agricultural geospatial data is parsed by the geospatially located geometries 400 (field boundaries 401 or locations 402) provided from the database 303 in order to develop the geospatial relationship between the location of the agricultural data 109 and the location of the geospatial geometries 400. This relationship is developed by comparing the location of the agricultural geospatial data 109 with the location of the geospatial geometries 400. The comparison of location determines if the data 109 lies within the geospatial boundary of one or multiple of the geometries in the set 400, if the data 109 resides on the outside of all geospatial boundaries of the set 400, or if the data 109 intersects the geospatial boundary of one or multiple geometries in the set 400. As the relationship analysis between the agricultural geospatial data 109 and the geospatial geometries 400 is completed, a quantitative analysis is also being performed to quantify the geospatial distance between said agricultural geospatial data 109 and the geospatial geometries 400 for each said relationship that is developed.

After these geospatial relationships have been developed, the data then self-classifies itself into operational, travel, or ancillary categories in step 702. In this step the data, itself, again provides one of its collected parameters, which is the moving speed of the equipment, in order to relate the agricultural geospatial data 109 to an operating speed range and/or a travel speed range. Using the geospatial relationship, as well as the quantified geospatial distance, developed in step 701, along with the speed of movement relationship developed in 702, the agricultural geospatial data can self-classify itself into said categories. The relationships that the data 109 provides also provide the information to assign the agricultural geospatial data 109 to the proper geospatial geometry 401 402 in the set of geometries 400 for the given geometries located in database 303.

Agricultural geospatial data relationships developed from step 702 may include, for example, self-classification of the operational data category if the data resides in the boundary of a geospatial geometry 401 and the speed of the equipment is within the operating speed range, or self-classification of the travel data category if the data is outside of the geospatial geometry 400 and the speed of the equipment is within the travel speed range. These two examples of relationships, are discussed here to represent what the relationships may contain and in no way should limit the scope by which these relationships are built. It is known that many other relationships are common and possible but are just not discussed herein.

In specific embodiments of the agricultural data self-classification algorithm 602, the processes in steps 701 and 702 can be simplified for a specific explanation, in terms of one agricultural geospatial data point that contains a latitude and longitude coordinate, and one geospatial field boundary which contain a series of latitude and longitude coordinates that make up a boundary when that series is connected. The data point also contains information such as timestamp (time the data point was collected), and collected parameters, such as speed of the machine, engine load, fuel usage, etc. The self-classification process relates the location of the data point to the location of the field boundary, i.e., does the point lie within the boundary, is it outside of the boundary, and how close is it to the boundary edge. It then takes this relation and performs a similar relation with the moving speed of the equipment that is associated with the data point in order to relate it to an operating speed range and/or a travel speed range. When the relationships have been developed the data point can properly classify itself based on where it was located and how fast the equipment was moving at the time of data collection.

In terms of the specific embodiment displayed in FIG. 7, the data classification categories may be described as follows. Data 109 that is classified as operational, may represent the geospatial data 109 that is performing an agricultural task for a field boundary 401. Travel data may represent the data 109 that occurs when agricultural equipment 101 is moving from one geospatial geometry 401 402 to another geospatial geometry 401 402 in order to perform operational or ancillary work. The ancillary data then, may represent the geospatial data 109 that supports either travel or operational data and may be related to either a field boundary 401 and/or a location 402. An example of each of these classification types may be, but should not be limited to, operational data of an agricultural tractor and tillage equipment 101 performing tillage on a field boundary 401, a self-propelled sprayer 101 travelling from one field boundary 401 to another field boundary 401 in order to spray the next field, and finally ancillary data representing an agricultural tractor 101 connecting to an implement, like a tillage tool, in a barnyard 402 for example. These examples are meant to show what each data classification may represent, but in no way should be taken as limiting, as many other examples of each data classification exist, which will be apparent to those skilled in the art in light of the disclosures herein.

After the data 109 has been classified as operational, travel, or ancillary in 702, the data may then be transferred to the geospatial data event creation algorithm 603. This algorithm 603 contains three paths for the data to follow, which include one path for each data classification category; operational which starts at 703, travel at 704, and ancillary at 705. The skilled artisan should recognize that although three paths are shown and described herein, greater or fewer numbers of paths may be provided without departing from the scope of the present invention. The path specified for operational data starts with the process of aggregation 703 for all of the previously classified operational data. Using the timestamps of the data, when the data was initially measured and recorded from the agricultural equipment 101, along with a temporal analysis approach, the data can be divided, organized, and then aggregated for the creation of geospatial data events. This is an automated process, and allows the data to, once again, organize itself based on its own collected parameters. In this case, it is the time of data collection that allows the data to then group itself so that specific geospatial data events may be created.

In more detail, step 703 may start by analyzing the timestamp parameter of the classified operational data for one piece/group of agricultural equipment, which we'll call $101_0$ for explanation purposes, which has been assigned to one geospatial geometry, which we'll call $401_0$ also for explanation purposes. Analyzing data for agricultural equipment $101_0$ on one geospatial geometry $401_0$ allows for a direct timestamp comparison which provides a temporal density measurement of the data. This temporal density measurement then allows for gaps in time to be identified so the data can be partitioned at the identified gaps and aggregated in-between for geospatial data event creation. This procedure allows the data to dictate the number of geospatial data events created for the given agricultural equipment $101_0$ on the given geospatial geometry $401_0$. This process 703 may then continue for each and every piece of equipment $101_{1\ to\ n}$ on that geospatial geometry $401_0$, and then starts again for the next geospatial geometry $401_1$ in the list until all geospatial geometries 400 contained in the database 302 have been analyzed.

In an alternate embodiment of 703, the data that is incoming and is directly classified in 702 may then also directly be sent to 703 for aggregation. In this embodiment, the temporal analysis using the timestamps of the classified data is still used, but instead of using a temporal density to identify separations in time so aggregation of the data may occur, the timestamps of the data are analyzed in comparison to the last recorded geospatial data event. In this way, the temporal comparison to the previous geospatial data event, and the corresponding timestamps of the classified data that make up the geospatial data event, can evaluate if a large enough gap in time has occurred to either create a new geospatial data event, or continue to aggregate the incoming data to the previous geospatial data event. This process, again, can then be applied for all agricultural equipment $101_{1\ to\ n}$ and all geo spatial geometries 400 that are contained within the database 302.

After the geospatial data is aggregated into operational data events in 703, the events can then be summarized to provide the operating characteristics of the events in 706. This step 706 of the algorithm 603 uses the aggregated data for each event from 703 and summarizes all of the data for each measured parameter that was collected by the collection device 105. A few examples of these measured parameters include, but should not be limited to, speed of the agricultural equipment for the operation event, total time of the operation event, distance travelled during the operation event, and fuel used during the event. Particular embodiments may also include parameters such as, seeding rate during the event, application rate during the event, average yield during the event, harvest moisture data during the event, or any other machine, agronomic, or monitor/controller data parameter that may be collected by the data collection device 105.

This aggregation method 603 may also be completed for the agricultural geospatial data 109 that has been classified as travel data. This process, again, begins with aggregating the travel data for each piece/group of equipment 101 for every field boundary 401 or location 402. Using the timestamps of the geospatial data and a temporal analysis method, travel data events can be created. These travel data events may contain all of the relevant measured parameters in the data that the operational data contained, such as, but should not be limited to, speed of the agricultural equipment during the event, distance travelled during the event, and total time of the event. This data however, once aggregated into events, may also contain the travel event origin, or where it departed, as well as the destination, where the travel event arrived. These origins, and destinations, may be, but should not be limited to, field boundaries 401, staging areas, storage areas, or any location that has been marked as significant to the farm 402. After the travel events have been created, step 707 summarizes each event with the same technique used in 706 in order to provide the operating characteristics associated with each travel event.

The third path the geospatial data event creation algorithm 603 is for agricultural geospatial data 109 that has been classified as ancillary. This data can once again be aggregated by equipment 101 for each location 402 that is designated as a support site for the operation. These aforementioned locations may also include a geospatial boundary and/or location 402 so that the ancillary data can be classified and aggregated in step 705. The aggregation technique as well as the summarization technique are the same that are used for the operational data in 703, and travel data in 704. Operating characteristics for each ancillary event may then be created by the summarization technique in 708 so the next step 709 of the adaptive data analysis algorithm 304 may be completed.

The aggregation of the classified geospatial data for the creation of agricultural geospatial data events helps to provide another layer of context, and therefore, usefulness to the data that is being processed. The classification methods used in the self-classification algorithm 602, provide the data with context to which geospatial geometry 400 it belongs, as well as, which classification category it is. Aggregating this data then provides another layer of context which can be thought of as the geospatial data event layer. This layer of context allows for the summarization of the classified data in order to describe each individual geospatial data event. As farms make decisions on these geospatial data event types, the ability to form the context into a layer that is easily relatable farm managers 310 is important to make the agricultural geospatial data 109 useful, actionable, and also beneficial for further context to be built upon.

The summarizations of the operational 706, travel 707, and ancillary 708 data events then allow for the creation of a chronological list of these events for each and every field 401 and/or location 402 as they occurred in time. In terms of the operational data events, this process 709 starts by sorting the time of occurrence of each data event for a given geospatial geometry $401_0$, which would include all operational events for all agricultural equipment $101_{0\ to\ n}$. After the time series sorting, the list provides an order of operational data events for the geospatial geometry $401_0$, that we can call field events or field operation events, which occurred in chronological order and contain all of the associated agricultural equipment $101_{0\ to\ n}$ that performed the work. This process 709, can then be repeated again for all fields 401, and locations 402, until each geospatial geometry 400 contains a list of field events 305. These lists can then be used and transferred, via a communication network 110, to a client 113 for further processing as depicted in FIG. 6.

The same process 709, may then be repeated for travel data events and ancillary data events. Ancillary data events may use locations 402, which have been set up by the farm as significant, to order all of the equipment's ancillary operations as they occurred. Travel data events, on the other hand, are slightly different in that they may use the field boundary 401 and/or location 402 as a place that travel either originated from or arrived to, and can be ordered and listed for every field boundary 401 and/or location 402 in that manner.

FIG. 8 displays an example of a summarized agricultural geospatial data event list 305 that has been classified as operational and was generated through the above process for an individual field $401_0$. This data event list 305 contains not only the equipment the event corresponds to, but also the summarized operating characteristics that are obtained through the algorithmic processing of the adaptive data analysis algorithm 304. It should be noted that the geospatial data event list 305 contains information such as, total pass time, total distance covered, average speed, fuel used, and average engine load, but should not be limited to these summarization parameters as many others may be collected.

As FIG. 8 displays a simplified example of a summarized agricultural geospatial data event list 305, it may be realized that an alternate embodiment of this list may be a database that contains all of these geospatial data event lists 305. This database may contain all of the same information as displayed in the geospatial data event list 305 and may be used to query the data contained within for the further processing in client 113.

Figure 9:
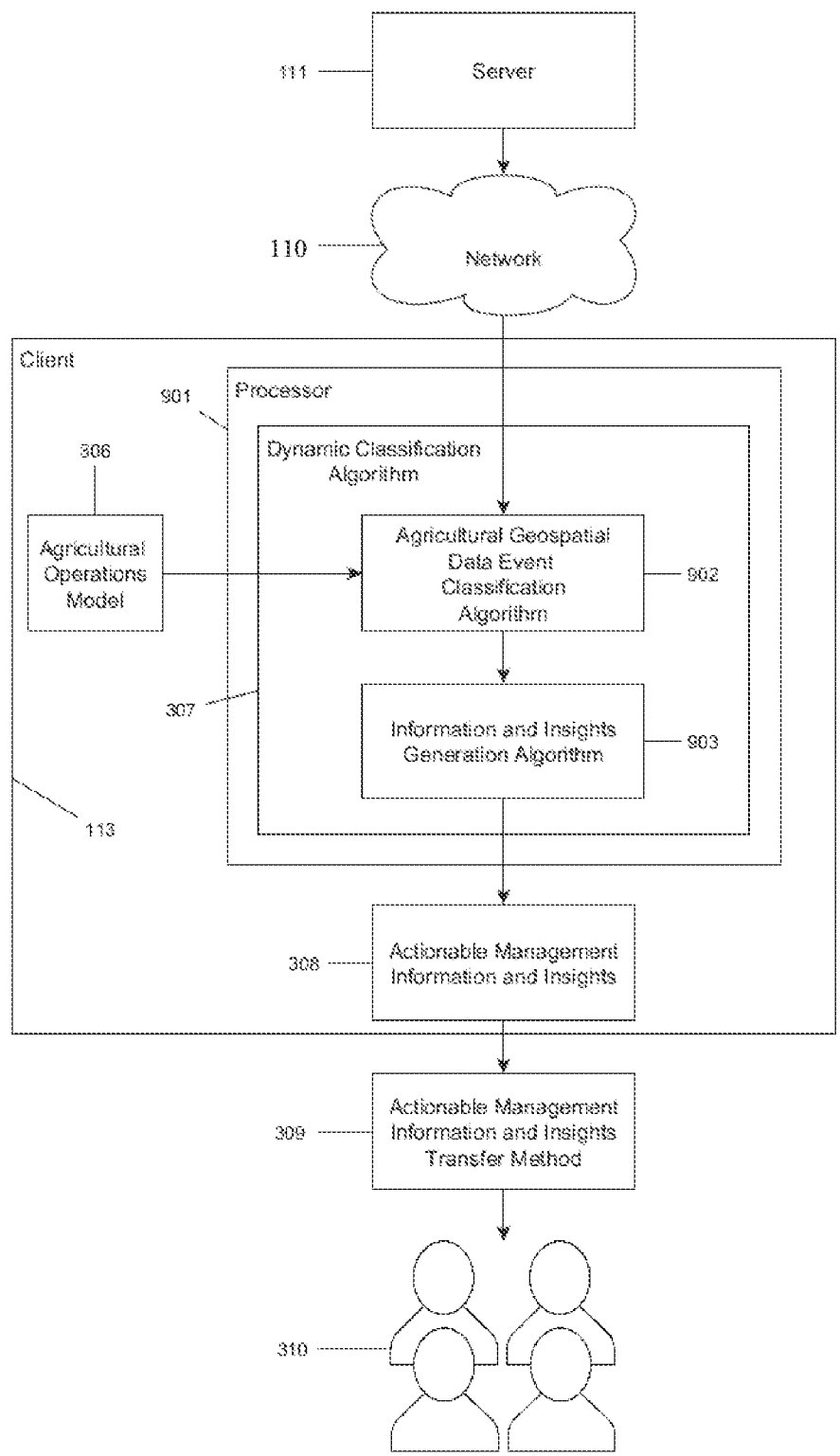
FIG. 9 is block diagram of the client.

With that alternate embodiment realized, FIG. 9 gives a more detailed view of the client 113, which inputs the summarized agricultural geospatial data events 305 as shown in FIG. 8 that have been transferred via the communication network 110. The client 113 may contain an agricultural operations model 306, a processor that may be able to perform algorithmic computer code/instructions 901, along with the dynamic classification algorithm 307, and the actionable management information and insights 308 generated by the algorithm 307. The dynamic classification algorithm 307 can also be divided into two pieces; the agricultural geospatial data event classification algorithm 902, and the information and insights generation algorithm 903. The agricultural geospatial data events 305 along with results from the agricultural operations model 306 are used within the data event classification algorithm 902 in order to classify each event that occurred within the field boundary 401 and/or location 402. Once the classification of the geospatial data events 305 have been classified in step 902 the events 305 are then provided to the information and insights generation algorithm 903 in order for actionable information and insights 308 to be generated.

In an alternative embodiment, the agricultural operations model 306 may instead be fully contained within the server 111 portion of the system, or the agricultural operations model 306 may also be a hybrid model where part of the model 306 is contained within the server 111 and part of the model 306 is contained within the client 113. Furthermore, the agricultural operations model 306 may also be structured as a database rather than a model. In this potential embodiment, information contained within the agricultural operations model 306 may be stored in the database and then used to help classify the agricultural geospatial data events 305 using the algorithm 307. In either of the potential configurations or structure of the agricultural operations model 306, it performs the same task in the system and is used to help generate actionable information and insights 308.

Figure 10:
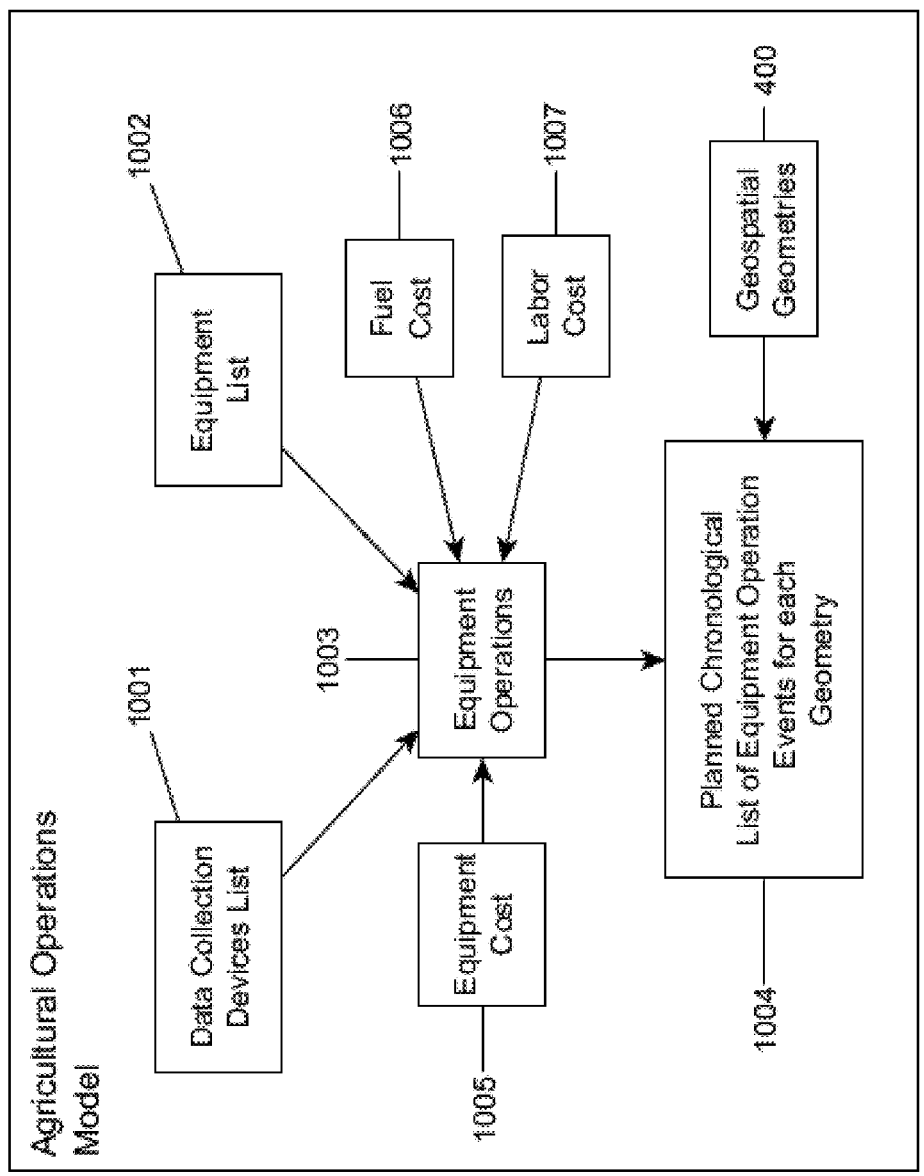
FIG. 10 is a block diagram of the agricultural operations model.

In order to do this, the agricultural operations model 306, which can be seen in more detail in FIG. 10, may create a planned, e.g., idealized, and optionally chronological, list of equipment operation events 1004 for every geospatial geometry 400. These geometries 400, may be from the geospatial geometry database 303, may come from a separate source, or may be a combination of the two. This model 306 may then use information such as a data collection device list 1001 along with an equipment list 1002 for the farm so that equipment 101 may be associated with the proper data collection device 105 in order for known devices 105 and equipment 101 to be used to create equipment operations 1003. Other planned information that may be associated with the equipment operations 1003 include, but should not be limited to, equipment cost information 1005, fuel cost information 1006, and labor cost information 1007 in order for cost parameters to be measured and associated with the operation events. These planned factors may then help in devising a planned chronological list of equipment operation events 1004. An example of a planned chronological list of equipment operation events 1004 can be seen in FIG. 11. Similar to the geospatial data events list 305, shown in FIG. 8, it may contain information such as the operating equipment 101 and the operation event name, as well as the summarized characteristics created from the model 306.

FIG. 11 shows a small subset of summarized characteristics for simplicity purposes, but it should be understood, that parameters such as, which should not be limited to, equipment cost, fuel cost, labor cost, total cost, downtime, and field efficiency may also be contained along with others.

In an alternate embodiment, the agricultural operations model 306 may not create a planned chronological list of equipment operation events 1004 for each field boundary. Instead the equipment operations 1003 may provide the necessary information to the dynamic classification algorithm 307 itself, so that actionable management information and insights may be created.

Also, in a similar fashion to the potential embodiment of a database for the agricultural geospatial data events 305, the chronological planned list of equipment operation events 1004 may also potentially reside in a database structure. This would, once again, contain all of the information and parameters that the planned list 1004 would contain and would perform the same function in the system to allow the dynamic classification algorithm 307 to classify/match the actual geospatial data events 305 with planned events 1004.

Figure 12:
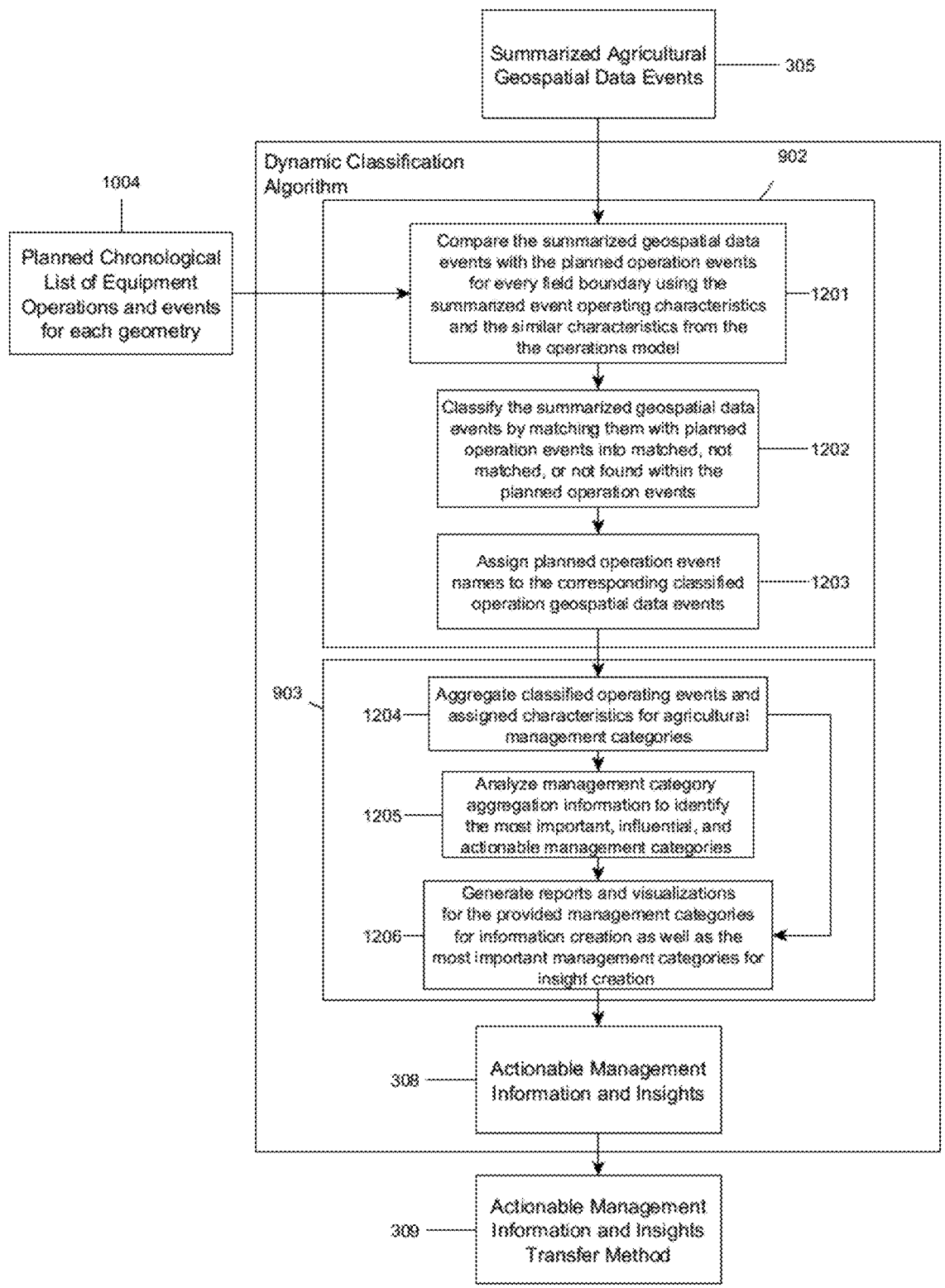
FIG. 12 is a detailed block diagram of the dynamic classification/matching algorithm that details the generation of actionable management information and insights.

FIG. 12 shows a more detailed flowchart of the dynamic classification algorithm 307 as described above that contains the agricultural geospatial data event classification algorithm 902, and the information and insights generation algorithm 903. The planned chronological list of equipment operation events for each field boundary 1004, along with the summarized agricultural geospatial data events 305, are used to compare against one another using their similar summarized characteristics in step 1201 of the data event classification algorithm 902. Based on how closely the summarized characteristics of the planned list events 1004 and the summarized events 305 are, the data event classification algorithm 902, then classifies each event for each field in 1202. The classifications of these events may be, but should not be limited to, an event found in the summarized geospatial data events 305 was matched to an operation event listed in the planned list of operation events 1004, an event from the geospatial events 305 was unable to be matched to an event in the planned list 1004, and the event 305 was unable to be found within the planned list 1004. This last classification may distinguish itself from the middle classification in terms of an example, in which an event 305 has been generated for an agricultural piece of equipment 101 with a data collection device 105 but the equipment 101 was not in the planned chronological list 1004, resulting in an unknown actual event, as opposed to, just unable to match an event 305 with an event in the planned list of 1004.

After the classification of the geospatial data events 305 has occurred, operation event names specified in the planned operation event list 1004 may be assigned to the corresponding matched and classified geospatial data events 305 in 1203. Extended information, resulting from the agricultural operations model 306 such as, but should not be limited to, equipment cost, fuel cost, and labor cost to calculate extended capacity and financial information, may also then be assigned as well. The information generation algorithm 903 may then take the assigned and geospatial data events 305 and generate actionable management information and insights 308.

In an alternate embodiment of the agricultural geo spatial data event classification algorithm 902, methods 1201, 1202, and 1203 that compare, classify and assign the summarized geospatial data events, may instead consist of just one step in which the planned list 1004 are assigned to the summarized geospatial data events 305. These planned geospatial events 1004 may be assigned through the use of time of occurrence of both the planned list of data events 1004 and the summarized geospatial data events 305 and how they occur chronologically. In an embodiment aforementioned where a planned list of events 1004 was not created, the single step method would assign the equipment operations 1003 with the geospatial data events 305. This assignment process would relate the specific agricultural equipment 101 with the equipment used in the summarized geospatial data event 305, along with the time of occurrence of the event 305, to assign the operation 1003 name and extended information from the agricultural operations model 306.

In either embodiment of the agricultural geospatial data event classification algorithm 902, the summarized geospatial data events 305 are matched with corresponding information from the agricultural operations model 306. The fitting of the summarized geospatial data events to the information from the agricultural operations model 306, is another way to provide further context to the data, which allows for further information and insights to be generated. It not only provides context to the data in which farm managers 310 can easily recognize, but it also provides some technical advantages. Creating context from the agricultural geospatial data 109 from the beginning of the analysis system 100, to automatically classify into operational, travel, and ancillary, then to assign to the proper geospatial data geometry 400, and finally aggregate and summarize the data into geospatial data events allows for easy fitting to the agricultural operations model 306. An easy fit to the agriculture operations model 306 allows for lower processing time and resources, and increases efficiency in the processes as not all potential outcomes, scenarios, and permutations need to be evaluated in order for a fit of the model 306 to occur. Data storage may also be reduced by this technique as not all of these various scenarios need to be stored for further comparisons and evaluations. Finally, any further aggregation of the summarized geospatial data events 305 may also be performed in a very computationally inexpensive manner as they have already been contextualized and would just need simple aggregation techniques performed on the queried data.

This is the case for the information and insights generation algorithm 903 as it begins with aggregating the classified/matched/assigned events by the different types of agricultural management categories 1204. These management categories may contain, but should not be limited to, the business farm entities or clients, land ownership entities or farms, fields, storage locations, staging areas, equipment, operations, laborers, or any other category that may be used to aggregate the summarized geospatial data events and their characteristics 305. Once the classified agricultural geospatial events 305 have been aggregated into management category, the aggregated information may be analyzed in order to identify the most important and influential management categories that may provide the most actionable information and insights 1205. This step may contain processes in which categories have been selected prior to analysis to identify the most important information and influential categories.

With actionable management categories and their relationships obtained in step 1205, the algorithm 903 can then generate reports, visualizations, actionable information, and insights 1206 in order to extract the significant relationships from the agricultural geospatial data events 305. The information and insights generated may be displayed, for example, in tabular reports, graphed visualizations of the geospatial event data, and summary information on both the results generated as well as the correlated actionable insights that the agricultural geospatial event data 305 may have provided. The actionable management information and insights 308, may also be generated to contain just the most actionable information and insights using step 1205, just all information and insights using the aggregated management category information from 1204, or a combination of both in order to provide the farm managers 310 with the most actionable and desired management information and insights 308 as possible.

In an alternate embodiment of the dynamic classification algorithm 307, the algorithm may perform similar steps as described above but in the scenario where one, two, or all three of the geospatial data events 305, the agricultural operations model 306, and the chronological planned equipment operation events 1004 are in a database structure. In this embodiment, the databases of the planned operation events 1004 and the geospatial data events 305 would be compared and matched to each other using a similar technique that is described above, but the way the data from 1004 and 305 would be accessed may be different as well as the underlying data structure. The process would still be able to obtain the classified geospatial data events as well as generate actionable information and insights. The databases may contain, but should not be limited to, the same operating characteristics as mentioned above but also contain extended financial information regarding the associated costs of equipment, inputs such as seed, fertilizer, and chemicals, and labor and may be used to compare, contrast, and align the data within the databases to achieve the classification and information and insights 308 generation.

It should also be noted here that, the dynamic nature of the classification algorithm 307 may be attributed to the inputs of the chronological list of operation events 1004 from the agricultural operations model 306, the summarized agricultural geospatial data events 305, as well as the structure of the algorithm itself. The inputs 1004 and 305 may dictate the results of the algorithm 308, by the way the algorithm 307 uses the information provided to generate the results 308. If new agricultural geospatial data 109 is collected and processed into new summarized agricultural data events 305, the algorithm may adjust to account for these new events 305. In a similar approach, if any parameter in the agricultural operations model 306 is modified that changes a related parameter, in any way, the algorithm may re-adjust for the new parameters in real-time so new actionable management information and insights 308 may be generated to reflect the change. These two input changes may also occur at the same time in which the new generated results 308 may also occur.

With the actionable management information and insights 308 generated, the management information and insights transfer method 309 may then transfer the information and insights 308 to the farm managers 310 for viewing purposes as depicted in FIG. 9. The actionable management information and insights transfer method 309 may include, for example, a connection that may be wireless or wired to a visual screen or monitor within the client 113 or to a wireless or wired connection to any device that is able to display the information and insights 308. This transfer method 309 may transfer the information and insights to the farm managers 310 and to any number of devices they may use, such as, for example, mobile phones, desktop or laptop computers, tablets, PDAs, printers, fax machines, or any device that is able to display and/or visualize the information and insights 308 sent.

Figure 13:
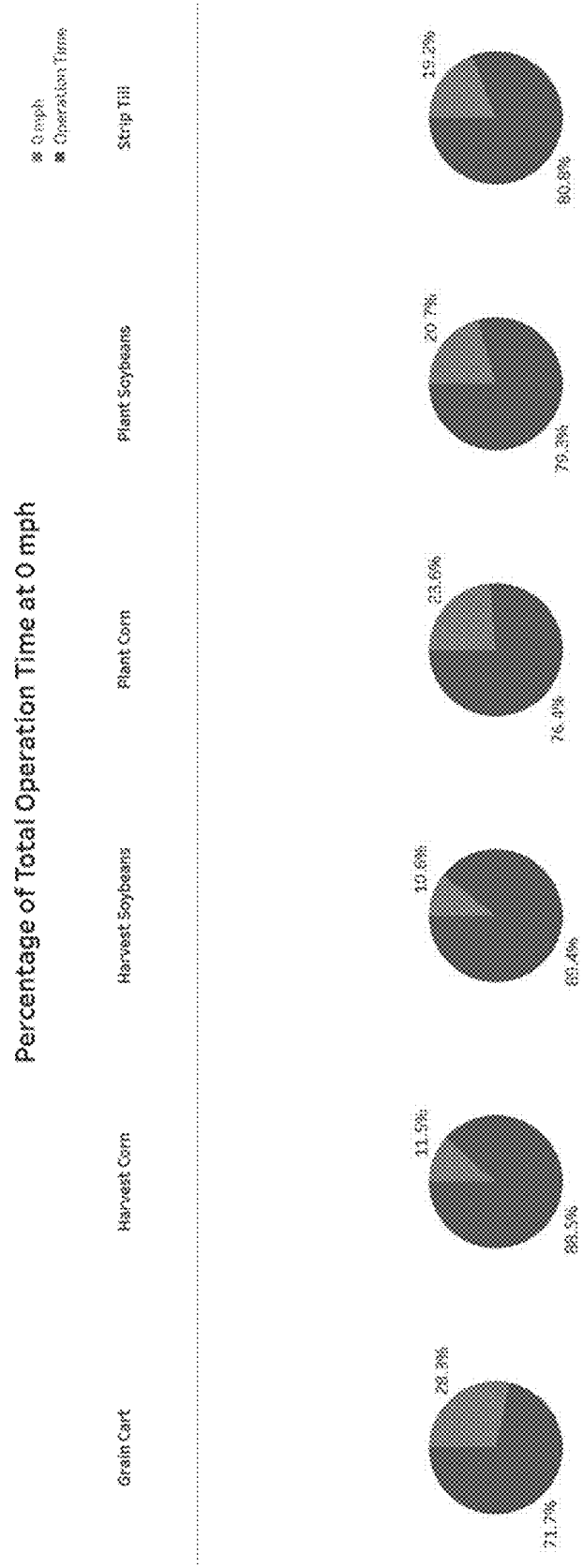
FIG. 13 is an example of actionable management information generated by embodiments of the present invention in terms of the percentage of time spent at 0 mph for operation events.
Figure 14:
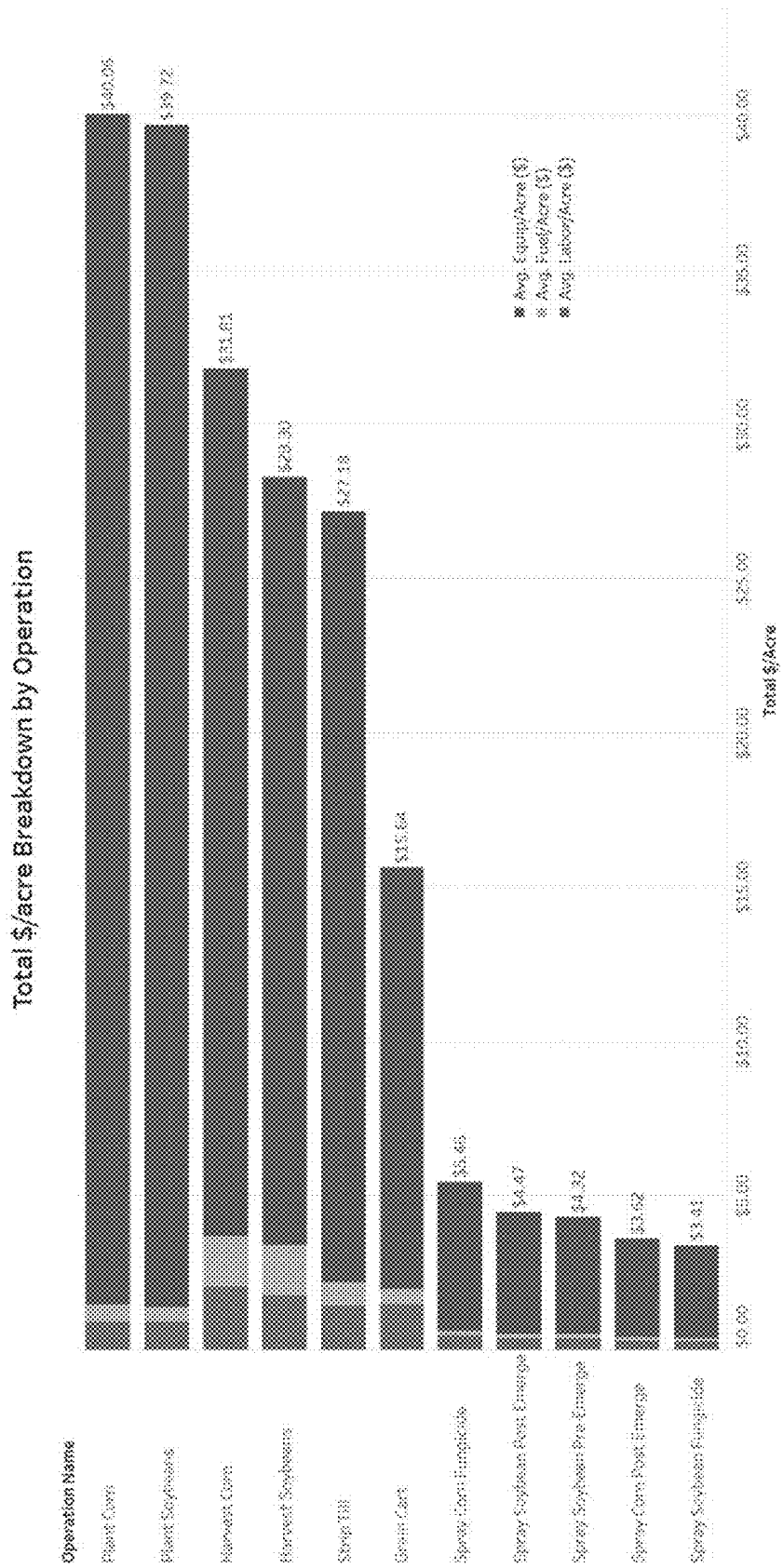
FIG. 14 is an example of actionable management information generated by embodiments of the present invention in terms of a $/acre cost breakdown of operation events.

FIG. 13 and FIG. 14 display examples of this actionable management information 308 that may be created by the system 100. FIG. 13 displays the percentage of total operation time that the equipment was not moving, or was at 0 mph, for different agricultural operation events. The information provided in FIG. 13 may then show farm managers 310, for example, which operation events had the largest percentage of downtime, or time at 0 mph, as well as the comparison of the time at 0 mph for similar operation events such as Plant Corn and Plant Soybeans. This information is actionable because it allows the farm managers 310 to make decisions based on equipment operators, equipment used, or on the equipment operation event itself in order to improve the performance.

In a similar manner, FIG. 14 displays a total cost per acre breakdown for each operation event in this example. The breakdown includes average equipment cost per acre, the average fuel cost per acre, and the average labor cost per acre for the operation events on all fields for the entire farm. From FIG. 14, information on the operation events that have been analyzed through the system 100 provided herein, may include which operations cost the most on a per acre basis, which operations have the most equipment, labor, and/or fuel cost per acre, the comparison of like operation events such as planting or spraying, and how much some operation events cost relative to other operation events. All of this information generated is actionable because it helps farm managers 310 make decisions on operators, equipment, logistics, or on the operation events itself, in an attempt to try and limit the cost of these operation events.

Once again, the results displayed in FIG. 13 and FIG. 14 are examples of actionable information 308 that may be generated through the system 100 presented herein. These in no way should be taken as limiting examples, but rather, are shown as simplified displays of the actionable information generated through the system.

Figure 15:
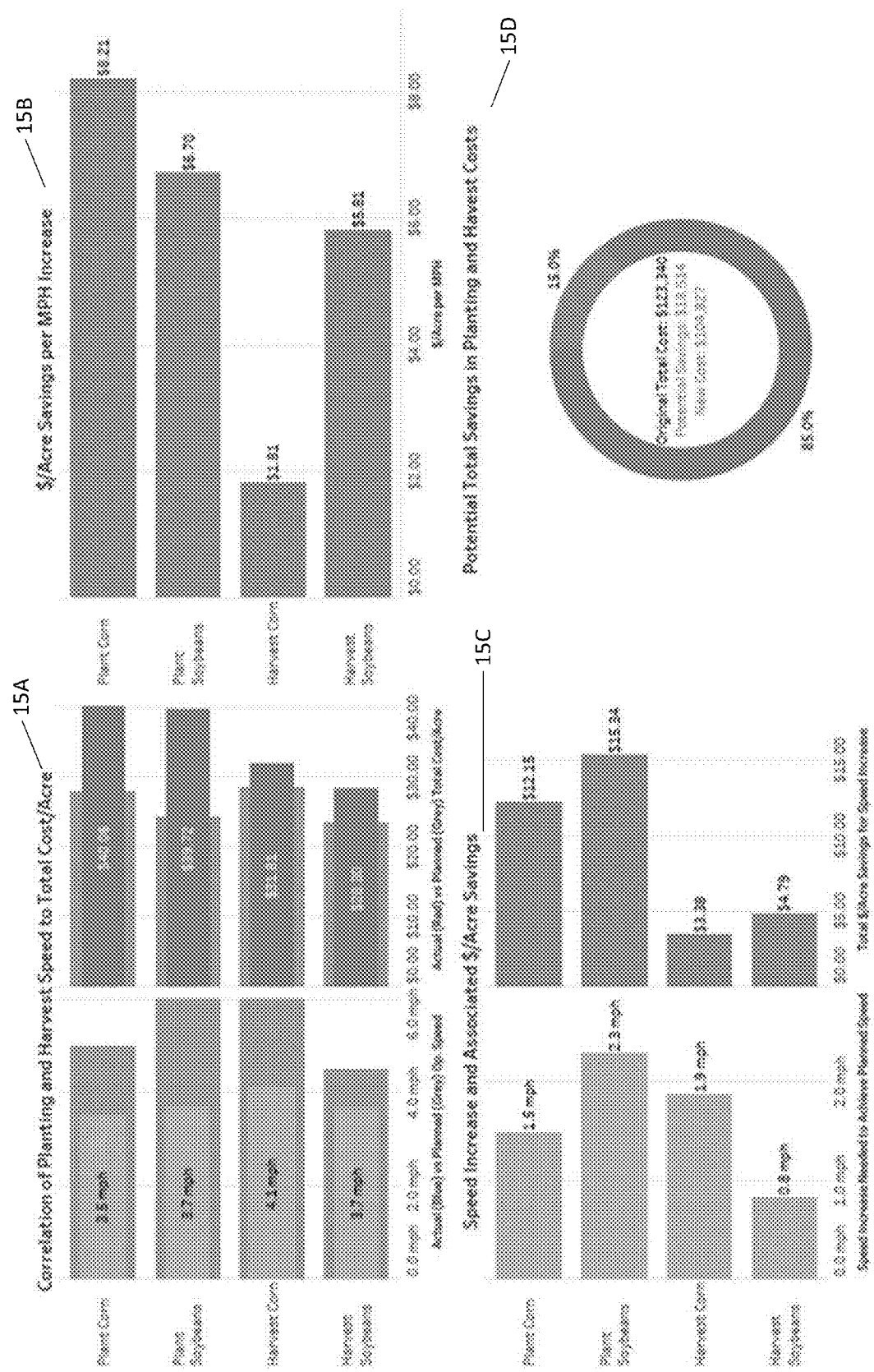
FIG. 15 shows an example of actionable management insights generated by embodiments of the present invention in terms of relating planting and harvesting speed to potential savings by increasing the average operation speed.

FIG. 15 displays an example of the actionable management information (also referred to herein as "management insight", "actionable insight", or simply "actionable information") 308 that may be generated from the system 100. This example should be taken as a simplified and a non-limiting example of what the system presented herein may be capable of providing.

FIG. 15 depicts the actionable insight 308 that may be generated from the system 100, in terms of total farm savings in planting and harvesting costs due to increasing the average operation speed. The figure is split into four main charts that visualize the correlation of planting and harvest speed to the total operation event cost per acre 15A, the dollar per acre savings per mile per hour (mph) increase 15B, the speed increase to reach planned speed and the associated dollar per acre savings for that increase 15C, and finally the total potential savings in planting and harvest costs all summed up 15D. These four charts take the information and generate the insights to allow the farm managers 310 to make the actionable decision, in this specific embodiment, of whether the planting and harvesting operation events should be performed at a higher speed. This decision can help be made by evaluating the insight provided from the four figures within the chart. It also allows for farm managers 310 to gain insight on the comparison of actual operation characteristics versus the planned characteristics, which can be thought of as a set standard. Setting a standard allows farm managers 310 to realize operational differences in actual versus the planned and manage accordingly to achieve that standard. The following describes an example of this in relation to operation speed and its associated costs.

In 15A the correlation of planting and harvest speed to the total dollar per acre cost can be seen. From the figure, it can be seen that the planned speed, which can be seen as the thicker gray bar on the left (speed) side of the chart, shows a faster operation event speed than does the actual operation event speed. This difference in speed can be correlated to the total cost per acre on the right ($/acre) hand chart in 15A. The slower speed of operation events show that the total cost of operation per acre is higher as opposed to the cost for the planned operation event speed. To help quantify this difference in cost due to the speed of operation, 15B shows the potential savings in total dollars per acre by a 1 mph average increase in speed of operation. This dollar per acre savings per mph can be seen for the different planting and harvesting operations and shows which of the operations may make the most sense to speed up if possible. With planting corn showing the highest dollar per acre savings per mph increase, it may make sense as the farm manager to try and speed up the corn planting operation event to obtain those potential savings. Whereas, the harvesting corn operation event may still prove to save money by speeding up the operation event, the savings may just not be by quite as much as the other operation events shown.

While 15A and 15B present the actionable insights to correlate speed of operation with the cost of operation, the lower two charts 15C and 15D provide the actionable insights 308 of total cost savings. In 15C, the chart displays the increase in speed of operation to obtain the planned speed of the operation event, as well as the dollar per acre savings for each of the operation event's speed increase. This chart shows that by increasing the average speed by the given amount, large potential savings may be seen in the total cost of operation. This total savings may then be rolled up and shown in the donut chart in 15D. This chart displays the total operation cost for both planting and harvesting as well as the potential savings from the total cost of operation. The chart visualizes that 15% of the total cost of operation may be saved if the planned speed of operation for planting and harvesting is achieved during the actual operation events. This potential 15% in savings would amount to $18,514 in savings for this specific embodiment. Driving the information provided to the insight of just achieving the planned average speed for planting and harvesting operation events could potentially save the farm $18,514. This may provide enough insight to drive the decision of the farm managers 310 to make sure that the operators of the equipment, for these operating events, achieve the speed of operation that was set. The insight of increasing speed of operation is an actionable decision for farm managers 310 to make and may allow them to optimize the farming operation events to help them save money, increase production and efficiency, and ultimately fine tune their overall performance of the farm operation.

With the potential advantages presented of increasing speed of operation for planting and harvesting operations, embodiments of the invention use this insight to provide the aforementioned operational directive of controlling the work machine 101 to achieve the set speed. This operational directive can be implemented through control of the various systems 201-211 communicably coupled to the equipment system bus 102, as shown in FIG. 2. For example, the engine 201, transmission 202, and electrical system 203, may be controlled, e.g., through the ECU of the work machine, to allow the work machine 101 to achieve the desired speed. This control may be obtained through an automated feedback system that allows information generated by the guidance system 112, to be sent in the form of an operational directive via cloud/communication networks 110 to the machine 101 in order to control the necessary systems on the equipment system bus 102. The operational directive(s) may also be used in a more manual, or semi-automated, manner in which the insight generated by guidance system 112 is displayed to an operator within the machine 101, so that the operator may implement the directive using conventional operating controls of work machine 101, e.g., by shifting gears and adjusting throttle speed. In any case, whether through the automated process of controlling the machine via equipment system bus 102, by operator control, or by some combination thereof, embodiments of the present invention allow the operational directive to be received, read, executed, and implemented.

Again, it should be understood that the above example of sending an operational directive of altering the speed of the machine 101 is just an example and should not be taken as limiting. As other operational directives are acted upon, any number of the systems 201 through 211 (FIG. 2), as well as other systems that may be developed in the future, may need to be controlled and adjusted in order to achieve the desired machine operation.

Figure 16:
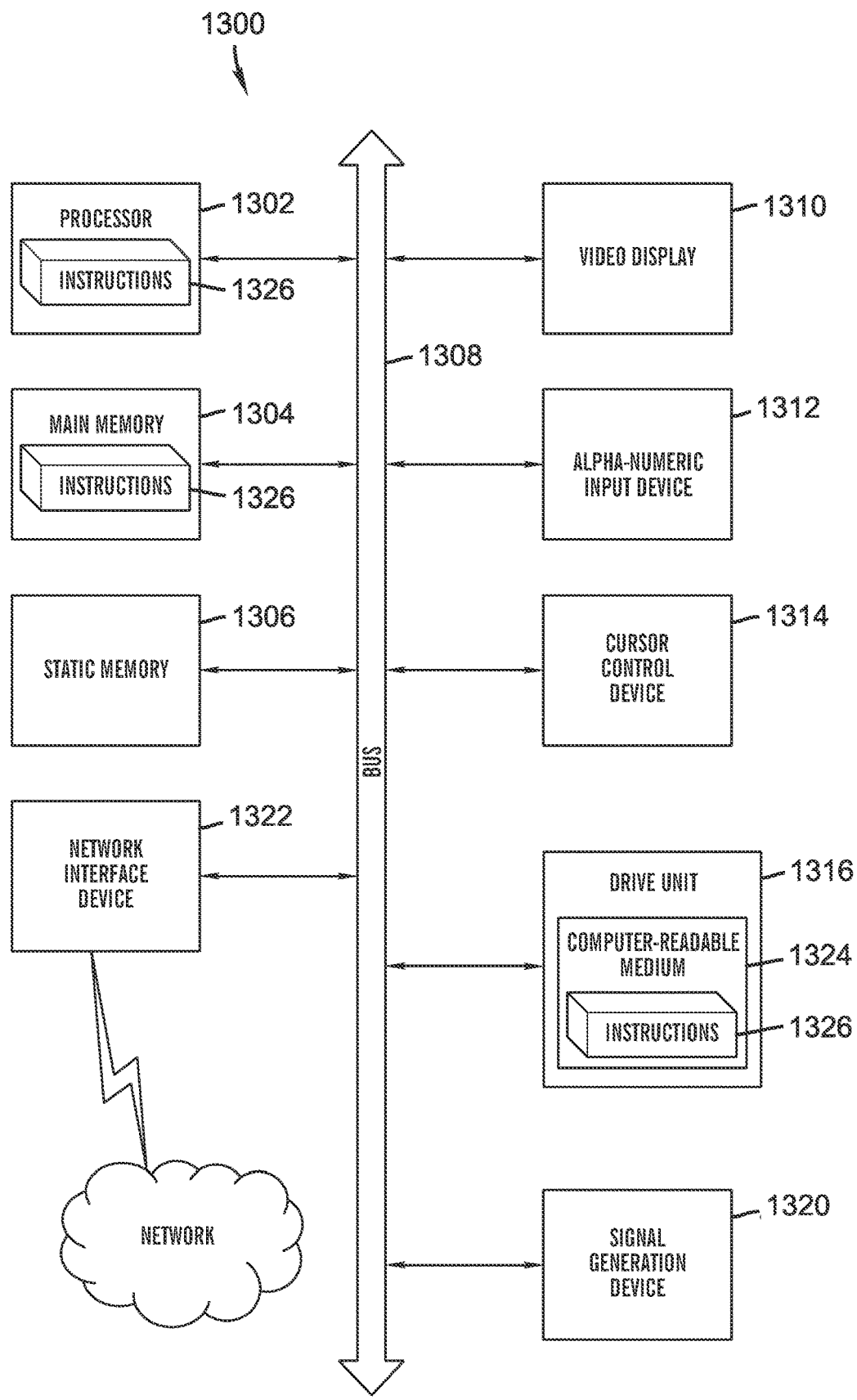
FIG. 16 is a block diagram of an exemplary computer usable in aspects of embodiments of the present invention.

FIG. 16 shows a diagrammatic representation of a machine in the exemplary form of a computer system 1300 within which a set of instructions, for causing the machine to perform methodologies discussed above, may be executed.

The computer system 1300 includes a processor 1302, a main memory 1304 and a static memory 1306, which communicate with each other via a bus 1308. The computer system 1300 may further include a video display unit 1310 (e.g., a liquid crystal display (LCD), plasma, cathode ray tube (CRT), etc.). The computer system 1300 may also include an alpha-numeric input device 1312 (e.g., a keyboard or touchscreen), a cursor control device 1314 (e.g., a mouse), a drive (e.g., disk, flash memory, etc.,) unit 1316, a signal generation device 1320 (e.g., a speaker) and a network interface device 1322.

The drive unit 1316 includes a computer-readable medium 1324 on which is stored a set of instructions (i.e., software) 1326 embodying any one, or all, of the methodologies described above. The software 1326 is also shown to reside, completely or at least partially, within the main memory 1304 and/or within the processor 1302. The software 1326 may further be transmitted or received via the network interface device 1322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols.

Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A machine guidance apparatus for completing farming operations with operational efficiency on a farm having at least one field or significant location, the apparatus comprising:

an agricultural work machine configured for traversing the farm, the agricultural work machine having an ECU (Electronic Control Unit) communicably coupled via a system bus to a plurality of machine system elements including an engine and sensors to control and monitor engine functions;

a farm implement operationally engaged with, and operated by, the agricultural work machine to effect farming operations as the agricultural work machine traverses the farm;

a GPS receiver disposed on the agricultural work machine to generate location data for the work machine; and a data collector communicably coupled to the GPS receiver and to the system bus, the data collector configured to capture agricultural geospatial data including the location data for the work machine from the GPS receiver and engine function data from the ECU; and a guidance system including a server disposed remotely from the agricultural work machine, the guidance system communicably coupled to the data collector, the guidance system having a memory and a processor, wherein the memory includes a stored program executable by the processor, the stored program configured to:
  (a) capture geospatially located geometries of the farm, including field boundaries and topographical features of the field;
  (b) use the geospatially located geometrics of the farm to mathematically generate a total farmable field area;
  (c) capture physical parameters of the farm implement, including a dimension transverse to forward movement of the agricultural work machine as the agricultural work machine traverses the farm;
  (d) capture the agricultural geospatial data;
  (e) automatically classify the agricultural geospatial data, using the geospatially located geometries of the farm, into one or more activity/event categories including operational events, travel events, and ancillary events, to produce classified data;
  (f) aggregate the classified data to create a plurality of geospatial data events;
  (g) match the plurality of geospatial data events to planned versions of said plurality of geospatial data events within an agricultural operations model to generate a plurality of matched events;
  (h) use the plurality of matched events to generate actionable information for the working machine in real-time or near real-time; and
  (i) generate and send operational directives to the agricultural work machine based on the actionable information, the operational directives including instructions for altering a direction of travel of the work machine to match an optimal direction of travel generated by the model to optimize field efficiency for an identified geospatial data event, based at least in part on the physical parameters of the farm implement and the total farmable field area.

2. The apparatus of claim 1, wherein the operational directives for the working machine include: (i) instructions for increasing or decreasing the speed of the working machine to match an optimal speed generated by the model for an identified geo spatial data event; (ii) instructions for shifting gears and reducing engine speed to match optimal levels generated by the model for an identified geospatial data event; and/or (iii) instructions to turn off the working machine during non-productive times.

3. The apparatus of claim 2, wherein the guidance system is configured to generate and send operational directives to the agricultural work machine in real-time or near real-time.

4. The apparatus of claim 1, wherein said automatically classify (e) comprises mapping the agricultural geospatial data to the geospatially located geometries of the farm to determine whether the agricultural geospatial data references a location (i) within any of the field boundaries, (ii) outside any of the field boundaries, or (iii) at an intersection of any of the field boundaries.

5. The apparatus of claim 4, wherein said automatically classify (e) further comprises determining whether the agricultural geospatial data references speed of the equipment within an operating speed range, or within a travel speed range.

6. The apparatus of claim 5, wherein said automatically classify (e) further comprises determining a type of work machine and/or implement used to generate the agricultural geospatial data.

7. The apparatus of claim 6, further comprising an implement sensor disposed on the work machine, configured to capture the type of work machine and/or implement.

8. The apparatus of claim 1, wherein the agricultural geospatial data further comprises temporal data; machine and equipment data including speed of the machine, engine load, fuel usage; agronomic data; monitor/controller data; equipment sensor data; and combinations thereof.

9. The apparatus of claim 8, wherein said location data provides a travel path of the work machine.

10. The apparatus of claim 1, wherein:
the operational events comprise the work machine performing agricultural tasks within field boundaries;
the travel events comprise the work machine moving from one field to another field; the work machine moving from one significant location to another significant location; and combinations thereof;
and
the ancillary events comprise the work machine engaging in operations supportive of the operational events and/or the travel events.

11. The apparatus of claim 10, wherein the operational events are selected from the group consisting of: planting; applications such as spraying or spreading; harvesting; tilling; grain or bulk crop carting; grain or bulk crop hauling; baling; seed tending; and preparation work such as swathing, windrowing, conditioning, raking, or tedding.

12. The apparatus of claim 11, wherein the ancillary events include idling and switching implements.

13. The apparatus of claim 1, wherein the actionable information is selected from the group consisting of: percentage of time the working machine spent idling during various ones of said geospatial data events; costs per acre associated with various ones of said geospatial data events; correlation of speed of working machine to costs associated with various ones of said geospatial data events; cost savings per acre as a function of speed of the working machine; and combinations thereof.

14. The apparatus of claim 1, wherein the engine function data from the ECU includes speed, fuel use and engine rpm/load data.

15. The apparatus of claim 1, wherein said capture (a) comprises using the GPS receiver to capture GPS coordinates of the boundaries and topographical features of a field as the agricultural work machine traverses the field.

16. The apparatus of claim 1, wherein said capture (a) comprises capturing coordinates of the boundaries and topographical features of a field from a map.

17. The apparatus of claim 1, wherein said capture (d) further comprises capturing a speed at which the farm implement is traversing the farm.

18. The apparatus of claim 1, wherein said aggregate (f) further comprises placing the plurality of geospatial data events into management categories.

19. The apparatus of claim 18, wherein the management categories are selected from the group consisting of: business farm entities or clients, land ownership entities or farms, fields, storage locations, staging areas, equipment, operations, laborers, and combinations thereof.

20. A method for completing farming operations with operational efficiency on a farm having at least one field or significant location, the method comprising:
providing an agricultural work machine configured for traversing the farm, the agricultural work machine having an ECU (Electronic Control Unit) communicably coupled via a system bus to a plurality of machine system elements including an engine and sensors to control and monitor engine functions, the agricultural work machine including a GPS receiver, a data collector, and a specialized guidance system including a server disposed remotely from the agricultural work machine, the guidance system including a memory and a processor, the memory including a stored program executable by the processor;
operationally engaging and operating a farm implement with the agricultural work machine;
capturing, with the data collector, agricultural geospatial data including location data for the work machine from the GPS receiver and engine function data from the ECU; and
executing the stored program to:
 (a) capture geospatially located geometries of the farm, including field boundaries and topographical features of the field;
 (b) use the geospatially located geometries of the farm to mathematically generate a total farmable field area;
 (c) capture physical parameters of the farm implement, including a dimension transverse to forward movement of the agricultural work machine as the agricultural work machine traverses the farm;
 (d) capture the agricultural geospatial data;
 (e) automatically classify the agricultural geospatial data, using the geospatially located geometries of the farm, into one or more activity/event categories including operational events, travel events, and ancillary events, to produce classified data;
 (f) aggregate the classified data to create a plurality of geospatial data events;
 (g) match the plurality of geospatial data events to planned versions of said plurality of geospatial data events within an agricultural operations model to generate a plurality of matched events;
 (h) use the plurality of matched events to generate actionable information for the working machine in real-time or near real-time; and
 (i) generate and send operational directives to the agricultural work machine based on the actionable information, the operational directives including instructions for altering a direction of travel of the work machine to match an optimal direction of travel generated by the model to optimize field efficiency for an identified geospatial data event, based at least in part on the physical parameters of the farm implement and the total farmable field area.

21. The method of claim 20, wherein the operational directives for the working machine include: (i) instructions for increasing or decreasing the speed of the working machine to match an optimal speed generated by the model for an identified geospatial data event; (ii) instructions for shifting gears and reducing engine speed to match optimal levels generated by the model for an identified geospatial data event; and/or (iii) instructions to turn off the working machine during non-productive times.

22. The method of claim 21, comprising generating and sending operational directives to the agricultural work machine in real-time or near real-time.

23. The method of claim 20, wherein said automatically classify (e) comprises mapping the agricultural geospatial data to the geospatially located geometries of the farm to determine whether the agricultural geospatial data references a location (i) within any of the field boundaries, (ii) outside any of the field boundaries, or (iii) at an intersection of any of the field boundaries.

24. The method of claim 23, wherein said automatically classify (e) further comprises determining whether the agricultural geospatial data references speed of the equipment within an operating speed range, or within a travel speed range.

25. The method of claim 24, wherein said automatically classify (e) further comprises determining a type of work machine and/or implement used to generate the agricultural geospatial data.

26. The method of claim 25, further comprising capturing, with an implement sensor disposed on the work machine, the type of work machine and/or implement.

27. The method of claim 20, wherein the agricultural geospatial data further comprises temporal data; machine and equipment data including speed of the machine, engine load, fuel usage; agronomic data; monitor/controller data; equipment sensor data; and combinations thereof.

28. The method of claim 27, comprising using the location data to provide a travel path of the work machine.

29. The method of claim 20, wherein:
the operational events comprise the work machine performing agricultural tasks within field boundaries;
the travel events comprise the work machine moving from one field to another field; the work machine moving from one significant location to another significant location; and combinations thereof;
and
the ancillary events comprise the work machine engaging in operations supportive of the operational events and/or the travel events.

30. The method of claim 29, wherein the operational events are selected from the group consisting of: planting; applications such as spraying or spreading; harvesting; tilling; grain or bulk crop carting; grain or bulk crop hauling; baling; seed tending; and preparation work such as swathing, windrowing, conditioning, raking, or tedding.

31. The method of claim 30, wherein the ancillary events include idling and switching implements.

32. The method of claim 20, wherein the actionable information is selected from the group consisting of: percentage of time the working machine spent idling during various ones of said geospatial data events; costs per acre associated with various ones of said geospatial data events; correlation of speed of working machine to costs associated with various ones of said geospatial data events; cost savings per acre as a function of speed of the working machine; and combinations thereof.

33. The method of claim 20, wherein the operational data for the work machine from the ECU includes speed, fuel use and engine rpm/load data.

34. The method of claim 20, wherein said capture (a) comprises using the GPS receiver to capture GPS coordinates of the boundaries and topographical features of a field as the agricultural work machine traverses the field.

35. The method of claim 20, wherein said capture (a) comprises capturing coordinates of the boundaries and topographical features of a field from a map.

36. The method of claim 20, wherein said capture (d) further comprises capturing a speed at which the farm implement is traversing the farm.

37. The method of claim 20, wherein said aggregate (f) further comprises placing the plurality of geospatial data events into management categories.

38. The method of claim 37, further comprising selecting the management categories from the group consisting of: business farm entities or clients, land ownership entities or farms, fields, storage locations, staging areas, equipment, operations, laborers, and combinations thereof.

* * * * *